US011378955B2

(12) United States Patent
Censi et al.

(10) Patent No.: US 11,378,955 B2
(45) Date of Patent: Jul. 5, 2022

(54) PLANNING AUTONOMOUS MOTION

(71) Applicant: Motional AD LLC, Boston, MA (US)

(72) Inventors: Andrea Censi, Somerville, MA (US); Emilio Frazzoli, Zurich (CH); Hsun-Hsien Chang, Brookline, MA (US); Kostyantyn Slutskyy, Singapore (SG); Scott D. Pendleton, Singapore (SG)

(73) Assignee: Motional AD LLC, Boston, MA (US)

( * ) Notice: Subject to any disclaimer, the term of this patent is extended or adjusted under 35 U.S.C. 154(b) by 380 days.

(21) Appl. No.: 15/872,554

(22) Filed: Jan. 16, 2018

(65) Prior Publication Data

US 2019/0079515 A1    Mar. 14, 2019

Related U.S. Application Data

(60) Provisional application No. 62/555,685, filed on Sep. 8, 2017.

(51) Int. Cl.
| G05D 1/00 | (2006.01) |
| G05D 1/02 | (2020.01) |
| G06N 20/00 | (2019.01) |
| B60W 40/10 | (2012.01) |
| G06N 5/04 | (2006.01) |
| G01C 21/34 | (2006.01) |

(52) U.S. Cl.
CPC ........... G05D 1/0088 (2013.01); B60W 40/10 (2013.01); G05D 1/0005 (2013.01); G05D 1/0212 (2013.01); G05D 1/0214 (2013.01); G05D 1/0221 (2013.01); G05D 1/0255 (2013.01); G05D 1/0257 (2013.01); G05D 1/0268 (2013.01); G06N 5/04 (2013.01); G06N 20/00 (2019.01); B60W 2710/18 (2013.01); B60W 2710/20 (2013.01); G01C 21/34 (2013.01); G05D 2201/0213 (2013.01)

(58) Field of Classification Search
CPC .............. G05D 1/0221; G05D 1/0088; B60W 60/0011; G01C 21/3453
See application file for complete search history.

(56) References Cited

U.S. PATENT DOCUMENTS 9,475,422 B2 * 10/2016 Hillis ....................... B60Q 1/26
9,507,346 B1    11/2016 Levinson et al.
9,632,502 B1 *  4/2017 Levinson ............ H04L 41/0816
(Continued)

FOREIGN PATENT DOCUMENTS

| CN | 102334151 | 1/2012 |
| CN | 106338988 | 1/2017 |

(Continued)

OTHER PUBLICATIONS

European Extended Search Report in European Application No. 18193340.9, dated Nov. 13, 2018, 8 pages.
(Continued)

Primary Examiner — Russell Frejd
Assistant Examiner — Sara J Lewandroski
(74) Attorney, Agent, or Firm — Fish & Richardson P.C.

(57) ABSTRACT

Among other things, planning a motion of a machine having moving capabilities is based on strategic guidelines derived from various basic principles, such as laws, ethics, preferences, driving experiences, and road environments.

36 Claims, 15 Drawing Sheets

(56) References Cited

U.S. PATENT DOCUMENTS

| | | | |
|---|---|---|---|
| 9,633,560 B1 | 4/2017 | Gao et al. | |
| 9,645,577 B1 | 5/2017 | Frazzoli et al. | |
| 9,734,455 B2* | 8/2017 | Levinson | G06N 7/005 |
| 9,884,630 B1* | 2/2018 | Ross | G07C 5/0808 |
| 9,910,441 B2* | 3/2018 | Levinson | G05D 1/0214 |
| 10,048,683 B2* | 8/2018 | Levinson | G06N 99/005 |
| 10,126,136 B2 | 11/2018 | Iagnemma et al. | |
| 10,168,705 B2 | 1/2019 | Kazemi | |
| 10,303,257 B2* | 5/2019 | Hillis | B60Q 1/26 |
| 10,309,792 B2 | 6/2019 | Iagnemma | |
| 10,331,129 B2 | 6/2019 | Iagnemma et al. | |
| 10,435,015 B2 | 10/2019 | Kong | |
| 10,591,910 B2* | 3/2020 | Levinson | G05D 1/0088 |
| 10,671,076 B1* | 6/2020 | Kobilarov | G08G 1/166 |
| 11,092,446 B2 | 8/2021 | Iagnemma | |
| 2003/0187578 A1* | 10/2003 | Nishira | G08G 1/167 |
| | | | 340/436 |
| 2008/0215202 A1 | 9/2008 | Breed et al. | |
| 2008/0303696 A1* | 12/2008 | Aso | G08G 1/161 |
| | | | 340/933 |
| 2011/0205042 A1* | 8/2011 | Takemura | B60W 30/08 |
| | | | 340/435 |
| 2012/0083947 A1* | 4/2012 | Anderson | G08G 1/166 |
| | | | 701/1 |
| 2014/0136414 A1 | 5/2014 | Abhyanker et al. | |
| 2015/0336502 A1* | 11/2015 | Hillis | B60Q 1/26 |
| | | | 701/23 |
| 2015/0345966 A1 | 12/2015 | Meuleau | |
| 2015/0348112 A1 | 12/2015 | Ramanujam | |
| 2016/0223345 A1 | 8/2016 | Thakur et al. | |
| 2016/0358479 A1* | 12/2016 | Riedelsheimer | G08G 1/0145 |
| 2016/0378110 A1 | 12/2016 | Phillips et al. | |
| 2017/0010679 A1* | 1/2017 | Hillis | B60Q 1/26 |
| 2017/0031361 A1* | 2/2017 | Olson | B60W 50/0097 |
| 2017/0123419 A1* | 5/2017 | Levinson | G08G 1/166 |
| 2017/0123428 A1* | 5/2017 | Levinson | G05D 1/0257 |
| 2017/0123429 A1* | 5/2017 | Levinson | G01C 21/34 |
| 2017/0124476 A1* | 5/2017 | Levinson | G06V 20/58 |
| 2017/0235848 A1 | 8/2017 | Van Dusen et al. | |
| 2017/0277195 A1* | 9/2017 | Frazzoli | B60W 30/00 |
| 2017/0285585 A1* | 10/2017 | Weast | B60W 30/09 |
| 2018/0088576 A1 | 3/2018 | Kong et al. | |
| 2018/0089563 A1* | 3/2018 | Redding | G06N 3/08 |
| 2018/0113455 A1 | 4/2018 | Iagnemma et al. | |
| 2018/0120857 A1* | 5/2018 | Kappauf | G01S 17/931 |
| 2018/0136644 A1* | 5/2018 | Levinson | G08G 1/005 |
| 2018/0141564 A1* | 5/2018 | Ross | B60W 40/08 |
| 2018/0329411 A1* | 11/2018 | Levinson | G06Q 10/06 |
| 2018/0356819 A1 | 12/2018 | Mahabadi et al. | |
| 2019/0034794 A1* | 1/2019 | Ogale | G06N 3/0454 |
| 2019/0079516 A1 | 3/2019 | Censi et al. | |
| 2019/0079517 A1 | 3/2019 | Censi et al. | |
| 2019/0079527 A1 | 3/2019 | Censi et al. | |
| 2019/0163191 A1* | 5/2019 | Sorin | G05D 1/0088 |
| 2019/0235635 A1* | 8/2019 | Hillis | B60Q 1/26 |
| 2019/0308620 A1* | 10/2019 | Sapp | B60W 30/0956 |
| 2019/0329769 A1* | 10/2019 | Shalev-Shwartz | G08G 1/0968 |
| 2019/0329771 A1* | 10/2019 | Wray | B60W 30/18163 |
| 2019/0361432 A1* | 11/2019 | Levinson | G06Q 10/00 |
| 2021/0163010 A1* | 6/2021 | Takabayashi | B60W 40/02 |

FOREIGN PATENT DOCUMENTS

| | | |
|---|---|---|
| CN | 106647734 | 5/2017 |
| WO | WO2017/079219 | 5/2017 |

OTHER PUBLICATIONS

U.S. Appl. No. 15/872,627, filed Jan. 16, 2018, Censi.

U.S. Appl. No. 15/872,603, filed Jan. 16, 2018, Censi.

U.S. Appl. No. 15/872,614, filed Jan. 16, 2018, Censi.

Florentine et al., "Pedestrian notification methods in autonomous vehicles for multi-class mobility-on-demand service." Proceedings of the Fourth International Conference on Human Agent Interaction, Oct. 4, 2016, pp. 387-392.

Pendleton et al., "Autonomous golf cars for public trial of mobility-on-demand service." Intelligent Robots and Systems (IROS), 2015 IEEE/RSJ International Conference on Sep. 28, 2018, pp. 1164-1171.

Gerdes et al., "Implementable Ethics for Autonomous Vehicles," Autonomous Driving, Chapter 5, May 2016, pp. 87-102.

Oh et al., "Fuzzy Expert Rule-Based Airborne Monitoring of Ground Vehicle Behavior," Proceedings of 2012 UKACC International Conference on Control, Sep. 3-5, 2012, 534-539.

Yang et al., "Integrating the Intelligent Driver Model With the Action Point Paradigm to Enhance the Performance of Autonomous Driving," IEEE Access, Jun. 3, 2020, 106284-106295.

Chen et al., "Driving Maneuvers Prediction Based Autonomous Driving Control by Deeep Monte Carlo Tree Search", IEEE Transactions on Vehicular Technology, 69(7): 7146-7158, 2020.

Huang et al., "Optimal sliding mode guidance law with height deviation and terminal impact angle constraints", IEEE Aerospace Conference, 1-9, 2015.

Lin et al., "UAV Collision Avoidance with Varying Trigger Time", 2020 International Conference on Unmanned Aircraft Systems (ICUAS), 1257-1264, 2020.

Shalev-Shwartz, Shai, et al., "Avoiding a 'Winter of Autonomous Driving'" On a Formal Model of Safe, Scalable, Self-driving Cars, Aug. 17, 2017 (25 pages).

IEEE Advancing Technology for Humanity, "Ethically Aligned Design", Version 1—For Public Discussion, Dec. 13, 2016 (138 pages).

* cited by examiner

PLANNING AUTONOMOUS MOTION

CROSS-REFERENCE TO RELATED APPLICATIONS

This application claims priority under 35 U.S.C. § 120 to U.S. Provisional application 62/555,685, filed Sep. 8, 2017, the entire contents of which is incorporated here by reference.

BACKGROUND

This description relates to planning autonomous motion.

SUMMARY

Among other things, implementations of the technologies described in this document include motion planning and driving control based on rule-based hierarchies for operating machineries with autonomous capabilities.

In general, in one aspect, a method may include: (1) analyzing data associated with basic principles applicable to one or more motion actions of a machine to generate logical expressions associated with the basic principles, and (2) using the logical expressions to plan motion actions for the machine.

In some implementations, a basic principle may comprise a law, a regulation, a principle of ethics, a motion environment, an operation experience, a previously inferred logical expression, or a preference, or a combination of two or more of them. In some implementations, data may comprise real data, or simulated data, or both.

In some implementations, analyzing the data may comprise parsing one or more texts describing a basic principle. In some implementations, analyzing the data may comprise inferring one or more conditions and one or more proper actions associated with the one or more conditions. In some implementations, analyzing the data may comprise tracking one or more objects in sensor data and inferring a logical relation between two objects, or between two events, or between two times, or combinations of them.

In some implementations, generating logical expressions associated with the basic principles may comprise classifying the logical expressions into priority groups, organizing the priority groups into a hierarchy, or organizing the priority groups in a partial order, or organizing the priority groups in a strict order, or combinations of them. In some implementations, the hierarchy may comprise information about prioritization between two priority groups. Logical expressions belonging to a priority group may not be ordered. Logical expressions belonging to a priority group may not be partially ordered. Logical expressions belonging to a priority group may not be strictly ordered.

In some implementations, generating logical expressions associated with the basic principles may comprise organizing the logical expressions into a hierarchy, or organizing the logical expressions in a partial order, or organizing the logical expressions in a strict order, or combinations of them. In some implementations, the hierarchy may comprise information about prioritization between two logical expressions.

In some implementations, generating logical expressions associated with the basic principles may comprise one or more or all of the following: identifying one or more factors associated with a logical expression, determining values of factors, identifying missing factors using a linking process, linking two logical expressions based on a common factor, linking two logical expressions based on a common condition, or linking two logical expressions based on a common proper action.

In some implementations, generating logical expressions associated with the basic principles may comprise statistically evaluating occurrences of conditions, proper actions, and deviations from proper actions, or adjusting one or more logical expressions based on the occurrences, or both.

In some implementations, generating logical expressions associated with the basic principles may comprise expressing the logical expressions in machine instructions.

In some implementations, planning motion actions may comprise one or more or all of the following: identifying candidate trajectories, specifying sequences of the motion actions along a trajectory, evaluating a priority level of a motion action of the machine, evaluating a motion action of the machine complying with a proper action of a logical expression, or evaluating a deviation metric of a motion action of the machine deviating from a proper action of a logical expression. In some cases, a deviation metric may comprise energy consumption by the machine. In some examples, a deviation metric may comprise a financial loss by the machine. A deviation metric may be evaluated along an entire trajectory or a trajectory component.

In some implementations, the method includes generating a report of motion actions of the machine. In some implementations, generating a report may comprise one or more or all of the following: identifying a basic principle guiding a motion action, identifying an overwriting principle associated with a motion action, recording trajectories and motion actions, recording decisions on planning the motion actions for the machine, recording logical expressions used to plan the motion actions for the machine, recording deviation metrics of a motion action of the machine, detecting a risky event, generating an alert regarding the risky event, transmitting the report to a remote computing device, detecting a deviation away from a logical expression or away from a basic principle, determining a liability, integrating the report to the data associated with basic principles, or using the report to adjust processes of generating logical expressions.

In general, in one aspect, a method (e.g., motion planning) may comprise (1) applying logical expressions having conditions associated with proper actions to a machine having one or more autonomous motion capabilities to determine one or more possible motion actions of the machine, and (2) applying a metric of deviation from one or more proper actions to select one of the possible motion actions to be effected by the machine.

In some implementations, a logical expression may be derived from a basic principle comprising a law, a regulation, a principle of ethics, a motion environment, an operation experience, a previously inferred logical expression, or a preference, or a combination of two or more of them. In some implementations, a logical expression may be derived from real data, or simulated data, or both. In some embodiments, a logical expression may be derived from one or more or all of the following: parsing one or more texts describing a basic principle. In some examples, a logical expression may be derived from tracking one or more objects in sensor data and inferring a logical relation between two objects, or between two events, or between two times, or combinations of them.

In some implementations, the logical expressions may be organized into priority groups. The priority groups may be organized in a hierarchy. The priority groups may be organized in a partial order or a strict order. The hierarchy may comprise information about prioritization between two priority groups. Logical expressions belonging to a priority group may not be ordered. Logical expressions belonging to a priority group may not be partially ordered. Logical expressions belonging to a priority group may not be strictly ordered.

In some implementations, the logical expressions may be organized into a hierarchy. The logical expressions may be organized in a partial order or a strict order. The hierarchy may comprise information about prioritization between two logical expressions.

In some implementations, a logical expression may comprise one or more factors. The logical expression may be derived from statistically evaluating occurrences of conditions, proper actions, and deviations from proper actions. A logical expression may be adjusted based on the occurrences. A logical expression may be expressed in machine instructions.

In some implementations, selecting one of the possible motion actions may comprise evaluating a priority level of a motion action of the machine. In some implementations, selecting one of the possible motion actions may comprise evaluating a motion action of the machine complying with a proper action of a logical expression.

In some implementations, the deviation metric may comprise energy consumption by the machine. In some implementations, the deviation metric may comprise a financial loss by the machine. A deviation metric may be evaluated along an entire trajectory or a trajectory component.

In general, in one aspect, a method includes (1) comparing an executed motion action of a machine having one or more autonomous motion capabilities with one or more logical expressions, and (2) recording the comparison in a report.

In some implementations, the comparison may comprise one or more or all of the following: computing a deviation metric of the executed motion action with respect to a proper action specified in a logical expression, evaluating a priority level of the executed motion action, identifying a basic principle guiding the executed motion action, identifying a priority level of the executed motion action, or identifying a decision process for executing the executed motion action.

In some implementations, recording the comparison in a report may comprise one or more or all of the following: recording a traversed trajectory associated with the executed motion action, recording the executed motion action, recording a decision process for executing the executed motion action, or recording a logical expression used to select the executed motion action.

In some implementations, the method includes one or more or all of the following: detecting a risky event based on the comparison, generating an alert regarding a risky event, transmitting a report to a remote computing device, determining a liability based on the comparison, or feeding back the report into a generator of the one or more logical expressions.

In general, in one aspect, a method (e.g., liability evaluation) includes: (1) receiving a report recording motion actions executed by a machine, (2) evaluating deviation metrics of the executed motion action deviating from proper actions specified by logical expressions, and (3) determining liability for the executed motion actions.

In some implementations, the logical expressions may be derived from basic principles, where a basic principle may comprise a law, a regulation, a principle of ethics, a motion environment, an operation experience, a previously inferred logical expression, or a preference, or a combination of two or more of them. In some implementations, the logical expressions may be derived from parsing one or more texts describing a basic principle, from inferring one or more conditions and one or more proper actions associated with the one or more conditions, or from tracking one or more objects in sensor data and inferring a logical relation between two objects, or between two events, or between two times, or combinations of them, or from combinations of them.

In some implementations, the logical expressions may be classified into priority groups. The priority groups may be organized in a hierarchy with a partial order or a strict order. The hierarchy may comprise information about prioritization between two priority groups. Logical expressions belonging to a priority may not be ordered. Logical expressions belonging to a priority may not be partially ordered. Logical expressions belonging to a priority may not be strictly ordered.

In some implementations, the logical expressions may be organized in a hierarchy with a partial order or a strict order. The hierarchy may comprise information about prioritization between two logical expressions.

In some implementations, in which a deviation metric may comprise energy consumption by an executed motion action, or a financial loss by an executed motion action, or both. A deviation metric may be evaluated along an entire trajectory or a trajectory component.

In some implementations, determining the liability may comprise one or more or all of the following: identifying a basic principle guiding a proper action, identifying deviation of an executed motion away from the basic principle based on one or more deviation metrics, identifying an overwriting principle associated with a proper action, identifying deviation of an executed motion away from the overwriting principle based on one or more deviation metrics, identifying a trajectory associated with a proper action, identifying deviation of an executed motion away from the trajectory based on one or more deviation metrics, identifying a sequence of proper actions, or identifying deviation of a sequence of executed motions away from the sequence of proper actions based on one or more deviation metrics.

In general, in one aspect, a vehicle includes: (1) driving components including an acceleration component, a steering component, and a deceleration component; (2) autonomous driving capabilities to issue signals to the driving components to drive the vehicle in an at least partial autonomous driving mode; (3) an analysis component to analyze data associated with basic principles applicable to one or more motion actions of a machine to generate logical expressions associated with the basic principles, and (4) a command component to use the logical expressions to plan motion actions for the vehicle.

In some implementations, a basic principle may comprise a law, a regulation, a principle of ethics, a motion environment, an operation experience, a previously inferred logical expression, or a preference, or a combination of two or more of them.

In some implementations, the data may comprise real data, or simulated data, or both.

In some implementations, analyzing the data may comprise one or more or all of the following: parsing one or more texts describing a basic principle, inferring one or more conditions and one or more proper actions associated with the one or more conditions, tracking one or more objects in sensor data, or inferring a logical relation between two objects, or between two events, or between two times, or combinations of them.

In some implementations, generating logical expressions associated with the basic principles may comprise classifying the logical expressions into priority groups. The priority groups may be organized into a hierarchy. The priority groups may be organized in a partial order or a strict order. The hierarchy may comprise information about prioritization between two priority groups. Logical expressions belonging to a priority may not be ordered. Logical expressions belonging to a priority may not be partially ordered. Logical expressions belonging to a priority may not be strictly ordered.

In some implementations, generating logical expressions associated with the basic principles may comprise organizing the logical expressions into a hierarchy. The logical expressions may be organized in a partial order or a strict order. The hierarchy may comprise information about prioritization between two logical expressions.

In some implementations, generating logical expressions associated with the basic principles may comprise one or more or all of the following: identifying one or more factors associated with a logical expression, determining values of factors, identifying missing factors using a linking process, linking two logical expressions based on a common factor, linking two logical expressions based on a common condition, or linking two logical expressions based on a common proper action.

In some implementations, generating logical expressions associated with the basic principles may comprise statistically evaluating occurrences of conditions, proper actions, and deviations from proper actions. Generating logical expressions associated with the basic principles may comprise adjusting one or more logical expressions based on the occurrences.

In some implementations, generating logical expressions associated with the basic principles may comprise expressing the logical expressions in machine instructions.

In some implementations, planning motion actions may comprise one or more or all of the following: identifying candidate trajectories, specifying sequences of the motion actions along a trajectory, evaluating a priority level of a motion action of the machine, evaluating a motion action of the machine complying with a proper action of a logical expression, or evaluating a deviation metric of a motion action of the machine deviating from a proper action of a logical expression.

In some implementations, a deviation metric may comprise energy consumption by the machine. In some implementations, a deviation metric may comprise a financial loss by the machine. A deviation metric may be evaluated along an entire trajectory or a trajectory component.

In some implementations, the analysis component generates a report of motion actions of the machine. In some implementations, generating a report may comprise one or more or all of the following: identifying a basic principle guiding a motion action, identifying an overwriting principle associated with a motion action, recording trajectories and motion actions, recording decisions on planning the motion actions for the machine, recording logical expressions used to plan the motion actions for the machine, recording deviation metrics of a motion action of the machine, detecting a risky event, generating an alert regarding a risky event, transmitting the report to a remote computing device, detecting a deviation away from a logical expression or away from a basic principle, determining a liability, integrating the report to the data associated with basic principles, or using the report to adjust processes of generating logical expressions.

In general, in one aspect, an apparatus (e.g., a computing device or an electronic device) includes: a storage for instructions, and a processor to operate in accordance with the instructions to (1) analyze at least one logical expression having one or more conditions and one or more proper actions associated with the one or more conditions and (2) cause a machine to plan motion actions based on the logical expression.

In some implementations, the logical expression may be derived from a basic principle comprising a law, a regulation, a principle of ethics, a motion environment, an operation experience, a previously inferred logical expression, or a preference, or a combination of two or more of them. In some implementations, the logical expression may be derived from one or more or all of the following: parsing one or more texts describing a basic principle, inferring one or more conditions and one or more proper actions associated with the one or more conditions, or tracking one or more objects in sensor data and inferring a logical relation between two objects, or between two events, or between two times, or combinations of them.

In some implementations, the logical expression may be classified in one or more priority groups. The priority groups may be organized into a hierarchy. The priority groups may be organized in a partial order or in a strict order. The hierarchy may comprise information about prioritization between two priority groups. Logical expressions belonging to a priority may not be ordered. Logical expressions belonging to a priority may not be partially ordered. Logical expressions belonging to a priority may not be strictly ordered.

In some implementations, two or more logical expressions may be organized into a hierarchy. The two or more logical expressions may be organized in a partial order or in a strict order. The hierarchy may comprise information about prioritization between two logical expressions.

In some implementations, a logical expression may comprise one or more factors. The values of the one or more factors may be determined by a machine learning algorithm. In some implementations, one or more missing factors may be identified by a linking process. In some implementations, two logical expressions may be linked based on a common factor, based on a common condition, or based on a common proper action, or combinations of them.

In some implementations, the logical expression may be statistically evaluated based on occurrences of conditions, proper actions, and deviations from proper actions.

In some implementations, generating logical expressions associated with the basic principles may comprise adjusting one or more logical expressions based on the occurrences.

In some implementations, the logical expression may be expressed in machine instructions.

In some implementations, planning motion actions may comprise one or more or all of the following: identifying candidate trajectories, specifying sequences of the motion actions along a trajectory, evaluating a priority level of a motion action of the machine, evaluating a motion action of the machine complying with a proper action of a logical expression, or evaluating a deviation metric of a motion action of the machine deviating from a proper action of a logical expression. A deviation metric may comprise energy consumption by the machine. A deviation metric may comprise a financial loss by the machine. A deviation metric may be evaluated along an entire trajectory or a trajectory component.

In some implementations, the processor may generate a report of motion actions of the machine. In some implementations, generating a report may comprise one or more or all of the following: identifying a basic principle guiding a motion action, identifying an overwriting principle associated with a motion action, recording trajectories and motion actions, recording decisions on planning the motion actions for the machine, recording logical expressions used to plan the motion actions for the machine, recording deviation metrics of a motion action of the machine, detecting a risky event, generating an alert regarding the risky event, transmitting the report to a remote computing device, detecting a deviation away from a logical expression or away from a basic principle, determining a liability, integrating the report to the data associated with basic principles, or using the report to adjust processes of generating logical expressions.

In general, in one aspect, an apparatus (e.g., a user interface) includes: a processor, and a display configured by the processor to allow a user to indicate a request with respect to a motion of a machine; in which the processor (1) evaluates the request by analyzing a cost of the request using at least one logical expression, and (2) when the cost may be smaller a threshold, generates control commands associated with the request and transmits the control commands to a motion controller of the machine.

In some implementations, the logical expression may be derived from a basic principle comprising a law, a regulation, a principle of ethics, a motion environment, an operation experience, a previously inferred logical expression, or a preference, or a combination of two or more of them.

In some implementations, the logical expression may be derived from parsing one or more texts describing a basic principle.

In some implementations, the logical expression may be derived from inferring one or more conditions and one or more proper actions associated with the one or more conditions.

In some implementations, the logical expression may be derived from tracking one or more objects in sensor data and inferring a logical relation between two objects, or between two events, or between two times, or combinations of them.

In some implementations, the logical expression may be classified in one or more priority groups. The priority groups may be organized into a hierarchy. The priority groups may be organized in a partial order or in a strict order. The hierarchy may comprise information about prioritization between two priority groups. Logical expressions belonging to a priority may not be ordered. Logical expressions belonging to a priority may not be partially ordered. Logical expressions belonging to a priority may not be strictly ordered.

In some implementations, two or more logical expressions may be organized into a hierarchy. The two or more logical expressions may be organized in a partial order or in a strict order. The hierarchy may comprise information about prioritization between two logical expressions.

In some implementations, a logical expression may comprise one or more factors. Values of the one or more factors may be determined by a machine learning algorithm. One or more missing factors may be identified by a linking process. Two logical expressions may be linked based on a common factor, based on a common condition, or based on a common proper action, or combinations of them.

In some implementations, the logical expression may be statistically evaluated based on occurrences of conditions, proper actions, and deviations from proper actions.

In some implementations, the logical expression may be expressed in machine instructions.

In some implementations, evaluating the request may comprise one or more or all of the following: identifying candidate trajectories, specifying sequences of the motion actions along a trajectory, evaluating a priority level of a motion action of the machine, evaluating a motion action of the machine complying with a proper action of a logical expression, or evaluating a deviation metric of a motion action of the machine deviating from a proper action of a logical expression.

In some implementations, a deviation metric may comprise energy consumption by the machine. In some implementations, a deviation metric may comprise a financial loss by the machine. A deviation metric may be evaluated along an entire trajectory or a trajectory component.

In some implementations, the processor may generate a report of motion actions of the machine. In some implementations, the display may present information of the report.

In some implementations, generating a report may comprise one or more or all of the following: identifying a basic principle guiding a motion action, identifying an overwriting principle associated with a motion action, recording trajectories and motion actions, recording decisions on planning the motion actions for the machine, recording logical expressions used to plan the motion actions for the machine, recording deviation metrics of a motion action of the machine, detecting a risky event, generating an alert regarding the risky event, transmitting the report to a remote computing device, detecting a deviation away from a logical expression or away from a basic principle, determining a liability, integrating the report to the data associated with basic principles or using the report to adjust processes of generating logical expressions.

In general, in one aspect, a computing device (e.g., a server, a computer, a laptop, or a mobile device) includes: a storage for instructions; a network interface in communication with a machine having one or more autonomous motion capabilities; and a processor to operate according to the instructions stored in the storage to (1) analyze data associated with basic principles applicable to one or more motion actions of the machine, and (2) generate logical expressions to plan motion actions for the machine.

In some implementations, a basic principle may comprise a law, a regulation, a principle of ethics, a motion environment, an operation experience, a previously inferred logical expression, or a preference, or a combination of two or more of them.

In some implementations, the data may comprise real data, or simulated data, or both.

In some implementations, analyzing the data may comprise parsing one or more texts describing a basic principle. In some implementations, analyzing the data may comprise inferring one or more conditions and one or more proper actions associated with the one or more conditions. In some implementations, analyzing the data may comprise tracking one or more objects in sensor data and inferring a logical relation between two objects, or between two events, or between two times, or combinations of them.

In some implementations, generating logical expressions associated with the basic principles may comprise classifying the logical expressions into priority groups. The priority groups may be organized into a hierarchy. The priority groups may be organized in a partial order or in a strict order. The hierarchy may comprise information about prioritization between two priority groups. Logical expressions belonging to a priority may not be ordered. Logical expressions belonging to a priority may not be partially ordered. Logical expressions belonging to a priority may not be strictly ordered.

In some implementations, generating logical expressions associated with the basic principles may comprise organizing the logical expressions into a hierarchy. The logical expressions may be organized in a partial order or in a strict order. The hierarchy may comprise information about prioritization between two logical expressions.

In some implementations, generating logical expressions associated with the basic principles may comprise identifying one or more factors associated with a logical expression. In some implementations, generating logical expressions associated with the basic principles may comprise determining values of factors. In some implementations, generating logical expressions associated with the basic principles may comprise identifying missing factors using a linking process. Linking two logical expressions may be based on a common factor, based on a common condition, based on a common proper action, or based on combinations of them.

In some implementations, generating logical expressions associated with the basic principles may comprise statistically evaluating occurrences of conditions, proper actions, and deviations from proper actions. In some implementations, generating logical expressions associated with the basic principles may comprise adjusting one or more logical expressions based on the occurrences.

In some implementations, generating logical expressions associated with the basic principles may comprise expressing the logical expressions in machine instructions.

In some implementations, planning motion actions may comprise one or more or all of the following: identifying candidate trajectories, specifying sequences of the motion actions along a trajectory, evaluating a priority level of a motion action of the machine, evaluating a motion action of the machine complying with a proper action of a logical expression, or evaluating a deviation metric of a motion action of the machine deviating from a proper action of a logical expression.

In some implementations, a deviation metric may comprise energy consumption by the machine. In some implementations, a deviation metric may comprise a financial loss by the machine. A deviation metric may be evaluated along an entire trajectory or a trajectory component.

In some implementations, the processor generates a report of motion actions of the machine. In some implementations, generating a report may comprise one or more of the following: identifying a basic principle guiding a motion action, identifying an overwriting principle associated with a motion action, recording trajectories and motion actions, recording decisions on planning the motion actions for the machine, recording logical expressions used to plan the motion actions for the machine, recording deviation metrics of a motion action of the machine, detecting a risky event, generating an alert regarding a risky event, transmitting the report to a remote computing device, detecting a deviation away from a logical expression or away from a basic principle, determining a liability, integrating the report to the data associated with basic principles, or using the report to adjust processes of generating logical expressions.

These and other aspects, features, and implementations can be expressed as methods, apparatus, systems, components, program products, methods of doing business, means or steps for performing a function, and in other ways.

These and other aspects, features, and implementations will become apparent from the following descriptions, including the claims.

DESCRIPTION

Figure 1:
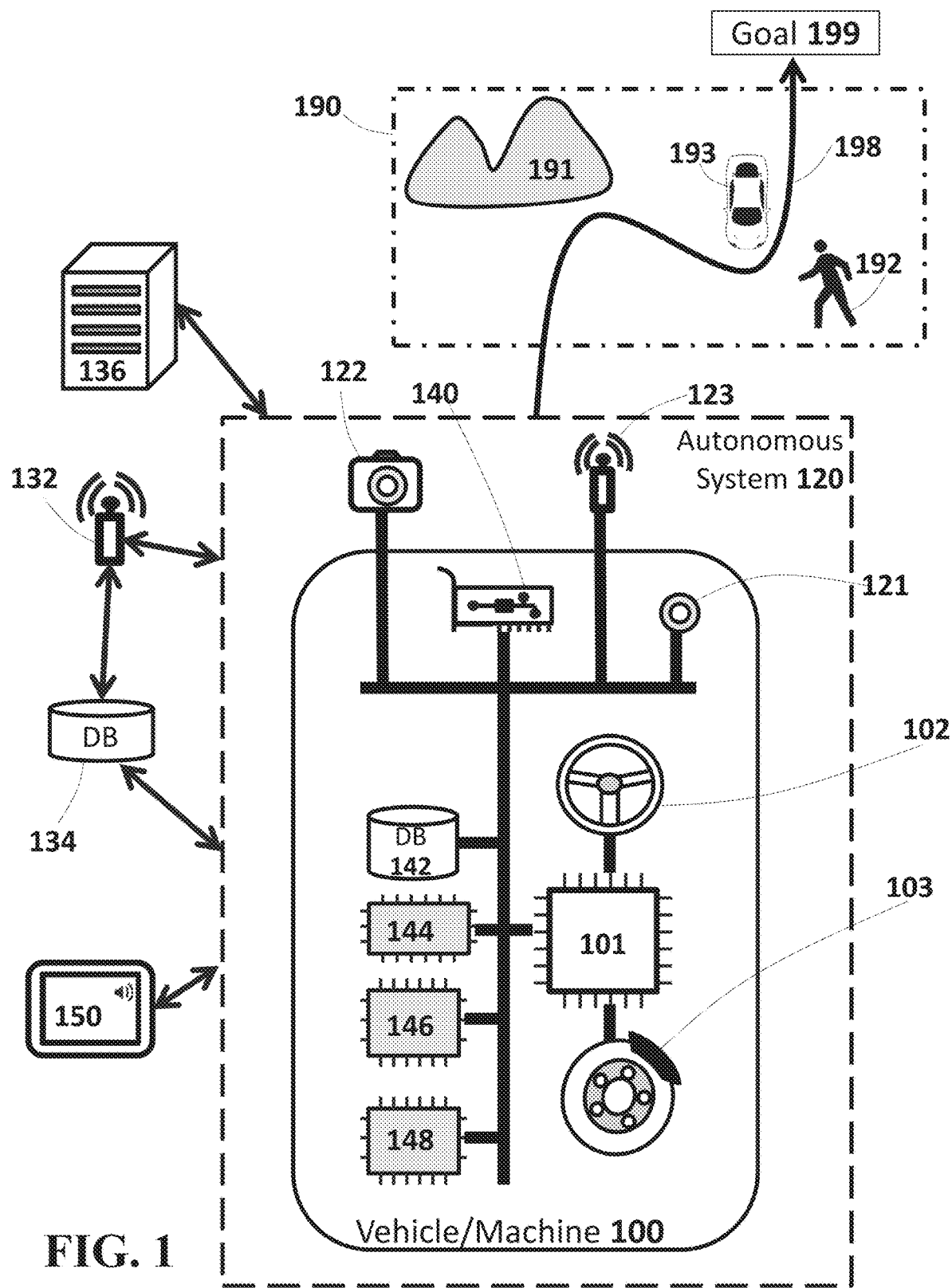
FIG. 1 is a block diagram of an autonomous system.

The term "autonomous motion capability" is used broadly to include, for example, any function, feature, or facility that can participate in the motion of an autonomous system other than by a person manipulating a physical component of the autonomous system.

The term "autonomous system" is used broadly to include, for example, any system including a machine having one or more autonomous motion capabilities.

The term "autonomous machine" or "motion machine" or simply "machine" is used broadly to include, for example, any kind of robot, vehicle, aerial vehicle, airplane, space shuttle, helicopter, marine device, or ship, among others, having one or more autonomous motion capabilities.

The term "basic principle" is used broadly to include, for example, any factor that guides, influences, or otherwise constrains motions of an autonomous system to, e.g., conform to social, cultural, legal, ethical, moral, or other behavioral rules, principles, or other norms, including or related to, for example, traffic laws, traffic rules, driving cultures, rules of using roads, preferred driving styles, pedestrian behavior, driving experiences, ethics, or boundaries of drivable areas, or combinations of them.

The term "strategic guideline" is used broadly to include, for example, any expression, description, articulation, definition, or logical relationship derived from one or more basic principles. In general, a strategic guideline indicates at least one condition and at least one proper motion action associated with the condition. This document sometimes uses the phrase "logical expressions" interchangeably with "strategic guidelines".

The term "motion environment" or sometimes simply "environment" is used broadly to include, for example, a spatial domain or a temporal domain or both where an autonomous system operates. A motion environment may have characteristics such as, time, objects in the environment (e.g., machines, vehicles, infrastructures, buildings, lights, clouds, trees, animals, people, pedestrians, water, and roads), configurations of the environment (e.g., road configurations, flight channels), laws and regulations (e.g., city regulations, state laws and regulations, and country laws and regulations), customs and cultures, and evens (e.g., collisions, fires, constructions, protests, sports, contests, exhibitions, and marathons), and weather conditions (e.g., rains, sunshine, storms, and snows).

The term "trajectory" is used broadly to include, for example, any path or route from one spatial point to another; for instance, a route from a pickup location to a drop off location or a path from one position in a parking space to another position in the parking space. A trajectory may be described in a low resolution (e.g., in kilometers), or in a high resolution (e.g., in meters or centimeters), or both.

The term "goal" or "goal position" is used broadly to include, for example, any place or area to be reached by a machine or vehicle, including, for example, an interim drop-off location, a final drop-off location, or a destination, among others.

The term "motion planning" or sometimes simply "planning" is used broadly to include, for example, any activity involving the planning of all of part of a trajectory, route, or movement of any scale of an autonomous system or machine. Motion planning typically involves identifying possible trajectories and then determining an optimal trajectory (or a portion of a trajectory).

Autonomous Motion System and Motion Machine

A category of autonomous systems comprises autonomous vehicles (AVs), vehicles having one or more autonomous motion capabilities in the form of autonomous driving capabilities, including fully autonomous vehicles, highly autonomous vehicles, and conditionally autonomous vehicles, such as so-called Level 5, Level 4 and Level 3 vehicles, respectively (see SAE International's standard J3016: Taxonomy and Definitions for Terms Related to On-Road Motor Vehicle Automated Driving Systems, which is incorporated by reference in its entirety, for more details on the classification of levels of autonomy in vehicles). Autonomous driving capabilities may attempt to control the steering or speed of the vehicles. The technologies described in this document also can be applied to partially autonomous vehicles and driver assisted vehicles, such as so-called Level 2 and Level 1 vehicles (see SAE International's standard J3016: Taxonomy and Definitions for Terms Related to On-Road Motor Vehicle Automated Driving Systems). One or more of the Level 1, 2, 3, 4 and 5 vehicle systems may automate certain vehicle operations (e.g., steering, braking, and using maps) under certain driving conditions based on processing of sensor inputs. The technologies described in this document can benefit vehicles in any levels, ranging from fully autonomous vehicles to human-operated vehicles.

As shown in FIG. 1, a typical activity of a motion machine 100 (e.g., an AV) is to safely and reliably engage in motion manually or autonomously or partially autonomously along a trajectory 198 within or through an environment 190 toward a goal position 199 while avoiding objects (e.g., barriers 191, obstructions, vehicles 193, pedestrians 192, buildings, cyclists, and other obstacles) and obeying rules of operation or driving preferences. The features, functions, and facilities of a machine 100 or of an autonomous system 120 that enable the motion machine 100 to engage in autonomous motion often are referred to as autonomous motion capabilities.

The motion of the machine 100 typically is supported by an array of technologies (e.g., hardware, software, and stored and real-time data) that this document together (and with the machine 100) sometimes refers to as an autonomous motion system 120. In some implementations, one or some or all of the technologies are on board the machine 100. In some cases, one or some or all of the technologies are at another location such as at a server (e.g., in a cloud computing infrastructure). Components of an autonomous system 120 can include one or more or all of the following (among others).

1. Functional devices 101 of the machine 100 that are instrumented to receive and act on commands for motion (e.g., steering 102, acceleration, deceleration, gear selection, and braking 103, in the case of a vehicle) and for auxiliary functions (e.g., turning signal activation, in the case of a vehicle) from one or more computing processors 146 and 148.
2. Data storage units 142 or memory 144 or both for storing machine instructions, or various types of data, or both.
3. One or more sensors 121 for measuring or inferring, or both, properties of the machine's state or condition, such as the machine's (or a portion of the machine's) position, orientation, linear and angular velocity and acceleration, and heading (e.g., an orientation of the leading end of the machine). For example, in the case of a vehicle, such sensors can include, but are not limited to: GPS; inertial measurement units that measure both vehicle linear accelerations and angular rates; individual wheel speed sensors for measuring or estimating individual wheel slip ratios; individual wheel brake pressure or braking torque sensors; engine torque or individual wheel torque sensors; and steering wheel angle and angular rate sensors.
4. One or more sensors for sensing or measuring properties of the machine's external and internal environment. For example, in the case of a vehicle, such sensors can include, but are not limited to: monocular or stereo video cameras 122 in the visible light, infrared or thermal (or both) spectra; lidar 123; radar; ultrasonic sensors; time-of-flight (TOF) depth sensors; speed sensors; and temperature and rain sensors.
5. One or more communications devices 140 for communicating measured or inferred or both properties of other machine states and conditions, such as positions, orientations, linear and angular velocities, linear and angular accelerations, and linear and angular headings. These devices include machine-to-machine (e.g., Vehicle-to-Vehicle) and machine-to-infrastructure (e.g., Vehicle-to-Infrastructure) communication devices and devices for wireless communications over point-to-point or ad hoc networks or both. The communications devices 140 can communicate across the electromagnetic spectrum (including radio and optical communications) or other media (e.g., air and acoustic media).
6. One or more communication interfaces 140 (e.g., wired, wireless, WiMAX, Wi-Fi, Bluetooth, satellite, cellular, optical, near-field, or radio, or combinations of them) for receiving data from a remotely located database 134 to the autonomous system 120, transmitting sensor data or data associated with driving performance to a remotely located database 134, or transmitting and receiving information associated with teleoperations, or combinations of them.
7. One or more data sources 142 for providing historical, or real-time, or predictive information, or combinations of them about the environment 190, including, in the case of a vehicle, for example, maps, driving performance, motion performance, traffic congestion updates or weather conditions. Such data may be stored on a data storage unit 142 or memory 144 on the machine 100, or may be transmitted to the machine 100 via a communications channel from a remote database 134 or a combination of them.
8. One or more data sources 136 for providing map data; e.g., digital road map data; geographic information system databases; maps of flight paths; maps of navigational channels; maps of the roadway geometric properties; maps describing road network connectivity properties; maps describing properties (such as traffic speed, traffic volume, the number of vehicular and cyclist traffic lanes, lane width, lane traffic directions, or lane marker types and locations, or combinations of them) of roads, flight paths, or navigational channels; and maps describing the spatial locations of road or navigational channel features such as, in the case of road vehicles, crosswalks, traffic signs or other travel signals of various. Such data may be stored on a memory 144 on the AV 100, or transmitted to the AV 100 via a communications channel from a remotely located database server 134, or a combination of the two.

9. One or more data sources 134 or sensors 132 for providing historical information about moving properties (e.g., speed, orientation, and acceleration profiles) of machines that have previously engaged in motions, for example, in the case of road vehicles, traveled within local areas, for example, at similar times of day. Such data may be stored on a memory 144 on the machine 100, or transmitted to the machine 100 via a communications channel from a remotely located database 134, or a combination of the two.

10. One or more computing devices 146 and 148 located on the machine 100 (or remotely or both) for executing algorithms for on-line generation of control behaviors based on both real-time sensor data and prior information, allowing the autonomous system 120 to execute its autonomous motion (e.g., driving) capabilities.

11. One or more processes for processing sensor data, perceiving the environment, understanding conditions that are currently presented by and may at future times be presented by the perceived environment, performing trajectory or motion planning, performing motion or driving control, and making decisions based on those perceptions and understandings. A process may be implemented by integrated circuits, field-programmable gate arrays, hardware, software, or firmware, or a combination of two or more of them.

12. One or more interface devices 150 (e.g., displays, mice, track balls, keyboards, touchscreens, mobile devices, speakers, biometric readers, and gesture readers) coupled to the computing devices 146 and 148 for providing information and alerts to, or receiving input from, a user (e.g., an occupant, an operator, or a remote user) of the machine 100, or both. The coupling may be wireless or wired. Any two or more of the interface devices may be integrated into a single device.

Motion Planning

Figure 2:
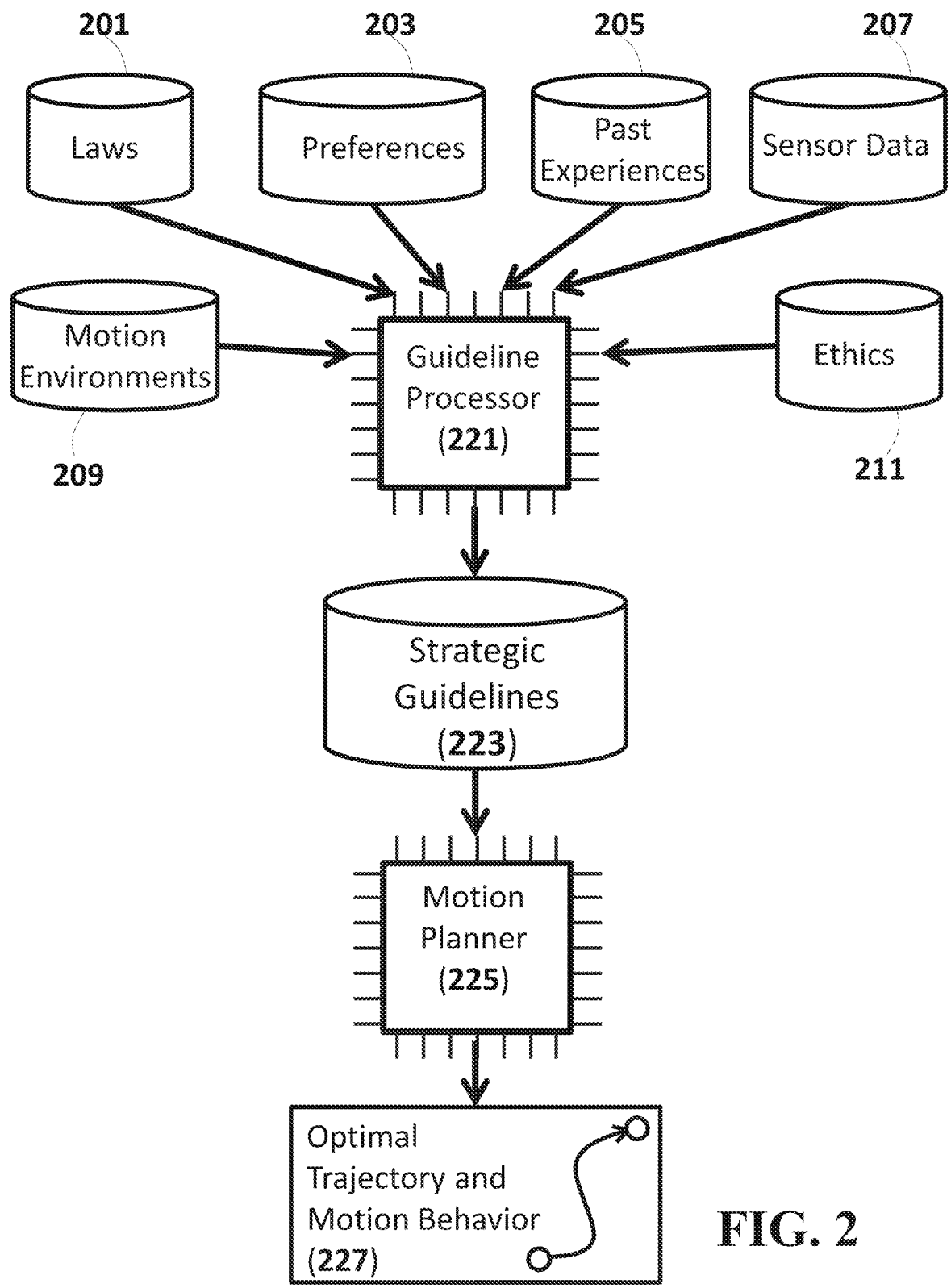
FIG. 2 is an example of a planning system based on strategic guidelines.

In general, operating an autonomous system includes planning its motions. Motion planning may take account of one or more basic principles. Referring to FIG. 2, examples of basic principles are described below.

1 In some implementations, basic principles may include laws 201 or regulations or rules or combinations of them. For example, in the case of vehicles, traffic laws may require autonomous systems (e.g., AV systems) to have their motions complying with speed limits, traffic lights, traffic signs, traffic directions, lane marks, passing rules, flight altitude, landing speed, landing orientation, navigational channel requirements, or combinations of them.

2 In some implementations, basic principles may include preferences 203 that do not have the force of law, rule, or regulation. For example, an autonomous system in the form of a road vehicle (e.g., an AV system) may prefer to move at the upper bound of speed limits, or may prefer to move at the speed of traffic even though the speed is a little bit beyond the speed limits. For instance, a user of the autonomous system (e.g., a rider of an AV system, a package sender using an AV system, and a passenger of an autonomous flying or marine system) may prefer the autonomous system to move along a comfortable trajectory without much jittering.

3 In some implementations, basic principles may include or be modeled upon motion behaviors from past experiences 205, which in some cases may be recorded in data (e.g., sensor data 207). For example, an autonomous system may be tested in an environment (e.g., a road environment, a water environment, a marine environment, a submarine environment, or an air environment), and the motion behaviors (e.g., speed, acceleration, orientation, height, and planned trajectory) of the autonomous system may be recorded and summarized as basic principles for that environment. In some instances of autonomous systems, such as road vehicles, basic principles derived from past drives on roads may be expressed, for example, as: "drive at a low speed at this road segment", "pedestrians tend to jaywalk at this road segment", or "keep right at this bifurcation".

4 In some implementations, basic principles may include characterization of motion environments 209 (e.g., roads, air spaces, waters, submarine regions, navigational channels, geolocations, infrastructures, traffic lights, traffic signs, street lights, buildings, lane marks, and perceived objects). For example, a building may block the detection range of a sensor (e.g., blocking a field-of-view of a vision sensor) for an autonomous system, so a basic principle may be described as: "be aware of blocked detection range near the building".

5 In some implementations, basic principles may include ethical concerns 211. For example, "do not cause any injured person" may be a preferred motion behavior when operating an autonomous system.

6 In some implementations, basic principles may include feedback from human users of the autonomous system. For example, passengers and the public may provide feedback about comfort and predictability. For instance, an autonomous patrol robot may be deployed in a mall, and visitors to the mall may provide comments on how the robot may patrol.

Known basic principles for autonomous systems are typically descriptive (e.g., natural language expressions) and lack clear, methodical, comprehensive logical relationships to corresponding motion behaviors. For example, a basic principle specifying that driving is normally prohibited in downtown Koln, Germany, on Sunday mornings may not be logically tied to what motion behaviors should provide based on that law. For instance, a vehicle at an intersection may encounter simultaneously a proceed signal (e.g., a green light) and a jaywalking pedestrian, and the vehicle may theoretically follow the traffic law to move ahead to hit the pedestrian without assuming liabilities; nevertheless, in real-life, the ethics concern in this instance may require the driver to stop at the proceed signal.

Basic principles typically lack quantitative measures. Basic principles are frequently described in the form of "if-then" statements; e.g., stop the vehicle if encountering a stop sign; if a traffic signal is red, make a full stop; if an object is detected, avoid hitting the object. However, it is uncertain or non-quantified or unspecified what will happen when deviating from or violating the "if-then" statement. In examples of vehicle driving, when a stop sign is detected, a vehicle may reduce its speed only to 0.05 m/s, and such a motion behavior may be acceptable although violating a traffic law that requires a full stop. In some scenarios, a basic principle may express a preference not to hit any object; e.g., if an object is detected, avoid hitting it. Thus, a car may by all means avoid hitting a pedestrian, and an unmanned aerial vehicle may always circumvent all high-rise buildings. However, because such a preference to avoid hitting one object (e.g., a pedestrian) may cause hitting another object (e.g., a parked car), or vice versa, it is useful to quantify motion decisions that while complying with a basic principle will have unintended or unsatisfactory results.

Referring FIG. 2, a motion planning system 200 may include a guideline processor 221 that analyzes basic principles and generates a corresponding set of strategic guidelines 223 (or called logical expressions in this document). The guideline processor 221 may be realized by a human, algorithmic processes, or hardware devices, or combinations of them.

The set of strategic guidelines 223 may be organized in the form of one or more databases. Each strategic guideline expresses the following items: (1) one or more conditions, (2) one or more proper actions associated with the one or more conditions, (3) strategic factors (e.g., distances, speeds, accelerations, decelerations, orientations, times, temperatures, seasons, chemical concentrations, zones, heights, and weights, to name a few) associated with the conditions and proper actions, and (4) a deviation metric (denoted by J in this document) quantitatively evaluating deviation from (e.g., a failure to comply with) the proper actions when a machine is in operation.

A condition and an associated proper action may be expressed in a logical relationship (e.g., causal, temporal, or spatial, or combinations of them). The proper action can be treated as a preferred motion action when the condition takes place.

For example, a basic principle (e.g., a traffic law 201) may state: stop the vehicle at a stop signal; the guideline processor 221 may analyze the statement and generate the following strategic guideline:
One or More Conditions: A stop signal is detected.
One or More Proper Actions: Make a full stop.
Strategic Factors: Speed of the vehicle.
Deviation Metric: A score equal to (or proportional to) the speed of the vehicle. When the vehicle makes a full stop, its deviation metric is J=0. When the vehicle does not stop, the deviation metric becomes J>0. If the vehicle does not stop but its speed is very slow (say, 0.1 m/s), its deviation metric is J=0.1. If the vehicle does not stop and remains a high speed at 20 m/s, its deviation metric is J=20.

For example, a basic principle in ethics (211) may state: when operating an autonomous system, never injure a person even if the person disobeys a traffic law. The guideline processor 221 may analyze the statement and generate the following strategic guideline:
One or More Conditions: A person is detected.
One or More Proper Actions: Keep a distance from the detected person.
Strategic Factors: Distance (denoted as d) between the person and the autonomous system.
Deviation Metric: When the autonomous system keeps at least a minimum distance from the person, its deviation metric is J=0. When the autonomous system is within the minimum distance from the person, the deviation metric becomes J=1/d.

For example, a basic principle in preferences (203) may state: bypass a bicyclist nearby. The guideline processor 221 may analyze the statement and generate the following strategic guideline:
One or More Conditions: A bicyclist is detected.
One or More Proper Actions: Bypass the detected bicyclist.
Strategic Factors: A width (denoted as w) between the detected bicyclist and another object allow the autonomous system to pass through. The width w must be larger than the width $w_a$ of the autonomous system.
Deviation Metric: When the width w is wider than a threshold $w_{thre}$ defined as the width $w_a$ of the autonomous system plus a buffer zone $w_b$, the deviation metric is J=0. When the width w is between the threshold $w_{thre}$ and the width $w_a$ of the autonomous system, the deviation metric becomes $J=1/w_b$. When the width w is smaller than the width $w_a$ of the autonomous system, the deviation metric is infinite J=∞.

Based on strategic guidelines 223, a motion planner 225 can quantitatively evaluate candidate trajectories (each of which corresponds to a sequence of motion actions) that it has under consideration and then select an optimal trajectory 227 from the candidates. An optimal trajectory may be, for example, the candidate trajectory whose motion actions, when compared with the proper actions in the strategic guidelines, lead to the smallest deviation metric.

Guideline Processor

In general, basic principles (e.g., laws, regulations, customs, cultures, or preferences, or combinations of them) may be described in human languages. In some implementations, basic principles (e.g., tests in an environment) may be captured by analyzing sensor data (e.g., images, videos, radar signals, lidar signals, GPS signals, ultrasound signals, geolocations, odometer readings, speed profiles, and status of the autonomous system), which are not or cannot be well expressed in a structured form. The guideline processor analyzes basic principles, possible conditions, possible proper actions, and possible strategic factors, for example, and generates corresponding logical, structured expressions of strategic guidelines.

Figure 3:
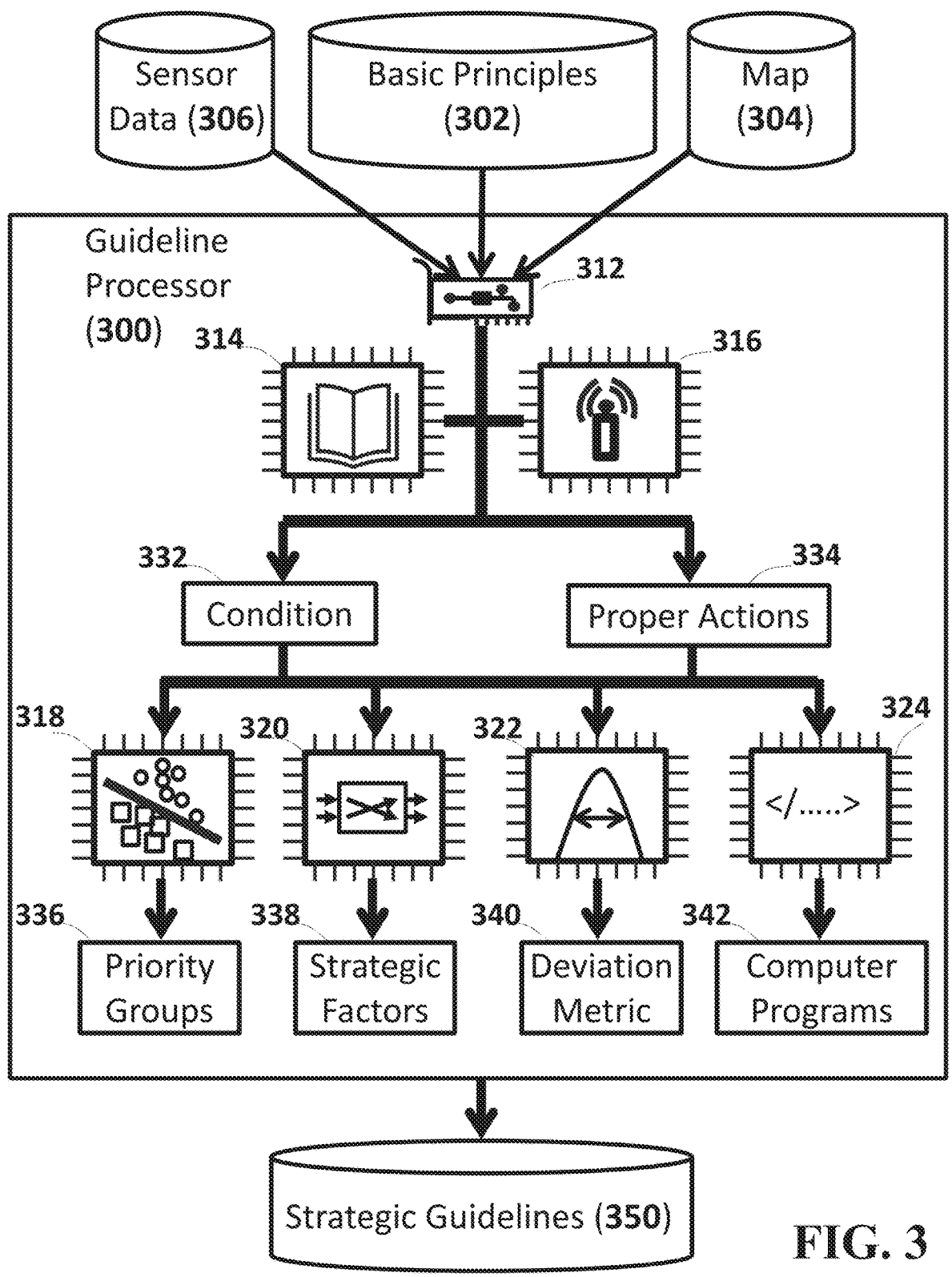
FIG. 3 is an example of a guideline processor.

Referring to FIG. 3, implementations of the guideline processor 300 may include a network interface 312 communicating with one or more data sources 302 of basic principles (e.g., laws 201, preferences 203, past operating experiences 205, sensor data 207, motion environments 209, ethics 211, user profiles, location features, and historical data).

Implementations of the guideline processor 300 may include natural language analysis (314 in FIG. 3). The guideline processor may parse the texts (e.g., laws or logs of past operating experiences) describing basic principles to extract conditions 332 and associated proper actions 334. In some cases, the texts of the basic principles may not use consistent words; e.g., one description may use "stop signal" and another description may use "red light", but the stop signal and the red light may refer to the same condition. The natural language analysis 314 may include machine learning algorithms to analyze and recognize words in basic principles, and infer distinct conditions and distinct proper actions and identify associations between the conditions and the proper actions.

The natural language analysis 314 may include logical reasoning. For instance, basic principles may state "yield to pedestrians" and "yield at pedestrian crossing." Although the two statements are written in different texts, the logical reasoning may aggregate them together and infer a single strategic guideline, which includes a condition as "pedestrian and crossing" and an associated proper action as "stop the autonomous system."

In some implementations, the logical reasoning may include inferring conditions associated with proper actions, or inferring proper actions associated with conditions, or both. For example, a basic principle stating "yield to pedestrians" does not clearly specify what the condition and the proper action are. Thus, the logical reasoning may infer the condition including "a detected pedestrian" or "when a pedestrian is detected" or "when a pedestrian is detected to be on the trajectory of the autonomous system". The associated proper action may be inferred as: "slow the speed and stop the autonomous system in front of the pedestrian".

In some implementations, different strategic guidelines may share a common condition. For example, a strategic guideline may recite a full stop as a proper action when a stop sign is detected as a condition at an intersection, and another strategic guideline may recite another proper action of perceiving any objects at the intersection for the same condition (a stop sign is detected at the intersection).

In some implementations, different strategic guidelines may share a common proper action. For example, two strategic guidelines may share a same action of making a full stop, but one strategic guideline may describe a condition of a detected stop sign and the other may describe a condition of a detected traffic light.

Implementations of the guideline processor 300 may include sensor data analysis (316 in FIG. 3) regarding basic principles to be considered. Examples of sensor data include images, video, radar signals, lidar signals, GPS signals, ultrasound signals, geolocations, odometer readings, speed profiles, and status of the autonomous system. The sensor data analysis may include tracking objects or detecting events or both, and then inferring logical relations (e.g., correlation, causal, temporal, and spatial) between objects or between events or both. In some cases, an autonomous system may be operated in a new environment (e.g., a road segment, or an air space). The guideline processor 300 may analyze the sensor data regarding the new environment to infer conditions and the associated proper actions. For example, a road segment may have animals (e.g., deer, geese, or seagulls) frequently trespassing across the road. Although there is no law regarding responding to animals on roads, the guideline processor 300 may analyze the sensor data to infer the proper action expressed by a strategic guideline as: "Condition: A detected animal in the road segment XXX" and "Proper Action: Slow down or yield to the detected animal in the road segment XXX".

Figure 4A:
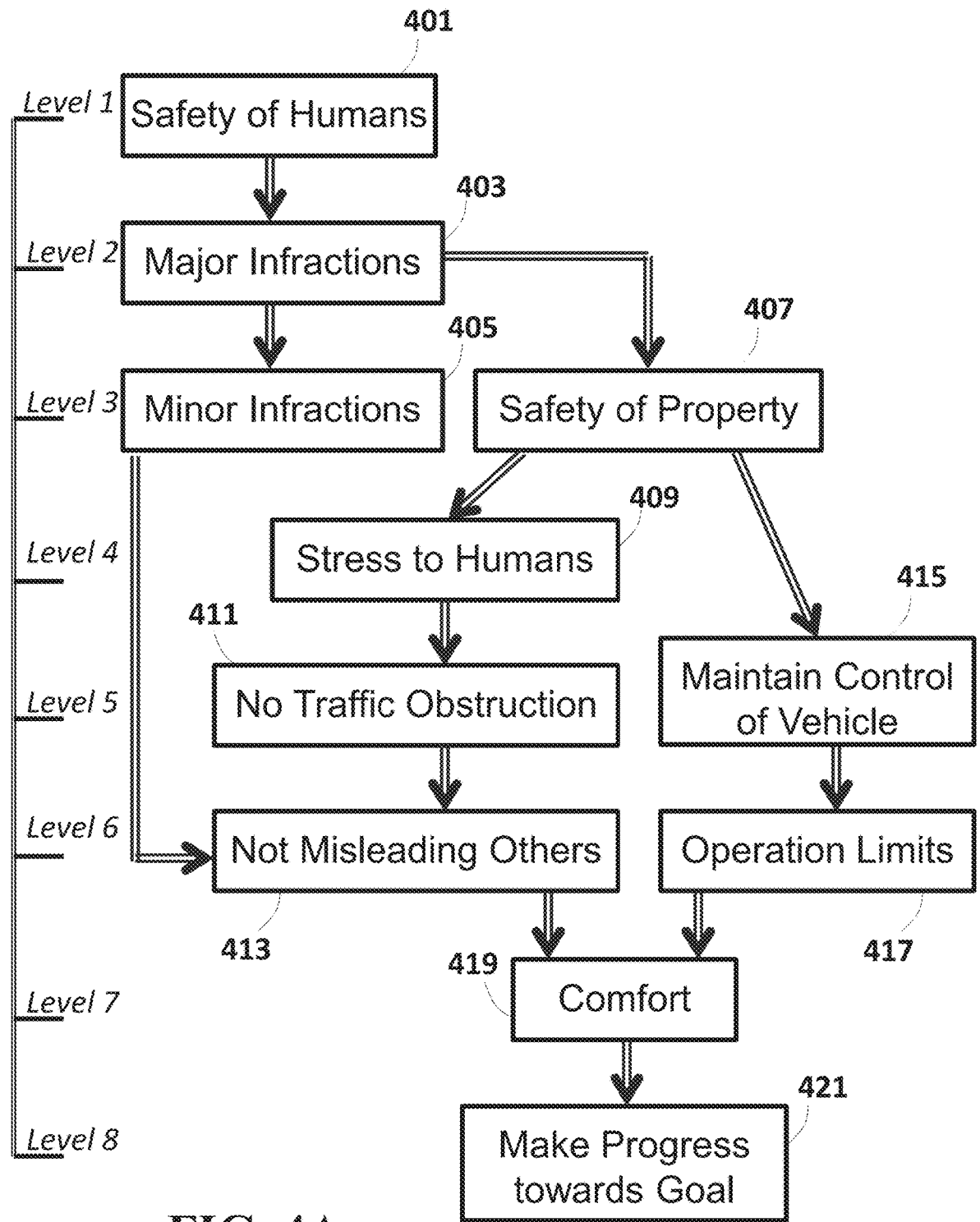
FIGS. 4A and 4B show examples of priority groups and hierarchical priority levels.

Implementations of the guideline processor 300 may include a priority classifier (318 in FIG. 3) classifying strategic guidelines into priority groups (336 in FIG. 3). FIG. 4A shows exemplary priority groups of strategic guidelines: Safety of Humans (401), Major Infraction (403), Minor Infraction (405), Safety of Property (407), Stress to Humans (409), No Obstruction to Traffic (411), Not Misleading Others (413), Maintain Control of Vehicle (415), Operation Limits (417), Comfort (419), and Make Progress towards Goal (421).

In some cases, a strategic guideline may be classified into more than two priority groups. For example, a strategic guideline of avoiding injuring pedestrians may be deemed in the priority groups of Safety of Humans (401) and Stress to Humans (409).

Implementations of the guideline processor may include assigning priority levels (e.g., principles of overriding) to priority groups and ordering the groups in terms of the priority levels. For instance, the strategic guidelines in the priority group of Safety of Humans 401 may be always a top priority, which can override other, conflicting strategic guidelines. The prioritization relations can be visualized as a hierarchical graph, where a prioritization relation may be denoted as an arrow with the node at the tail of the arrow having priority over the head node. Referring to FIG. 4A, the priority groups of strategic guidelines may be arranged in various priority levels, for example, where Safety of Humans (401) is priority level 1, Major Infraction (403) is priority level 2, Minor Infraction (405) and Safety of Property (407) are priority level 3, Stress to Humans (409) is priority level 4, No Obstruction to Traffic (411) and Maintain Control of Vehicle (415) are priority level 5, Not Misleading Others (413) and Operation Limits (417) are priority level 6, Comfort (419) is priority level 7, and Make Progress towards Goal (421) is priority level 8.

In some implementations, ordering priority groups may include partially ordering the priority groups. A partial order means that there are two or more priority groups whose relative priorities have not been determined. Referring to FIG. 4A, Major Infraction (403) may have priority over both Minor Infraction (405) and Safety of Property (407). However, neither Minor Infraction (405) nor Safety of Property (407) has priority over the other. In another example, neither Not Misleading Others (413) nor Operation Limits (417) has priority over the other, but they both have priority over Comfort (419).

Figure 4B:
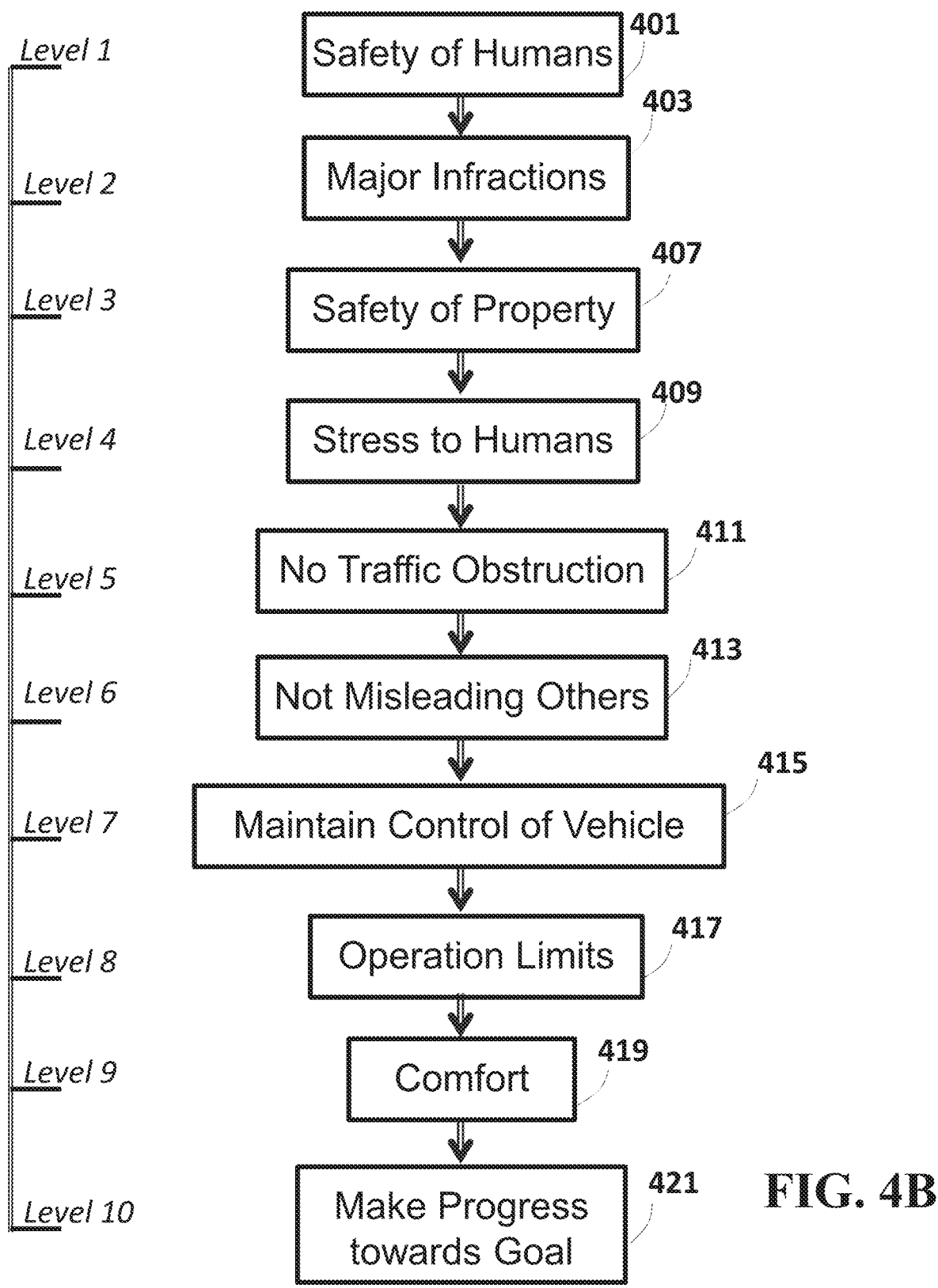

In some implementations, ordering priority groups may include strictly ordering all of the priority groups. A strict order means that the relative priorities of any pair of priority groups are pre-determined. The graphical representation of the strict order can be shown as a line. Referring to FIG. 4B, Stress to Humans (409), No Traffic Obstruction (411), No Misleading Others (413), Main Control of Vehicle (415), and Operation Limits (417) are organized in a strict order and there is no uncertainty in the relative priorities. In strict ordering, each priority group is assigned a distinct priority level, so the number of priority levels may increase; for example, the priority groups in FIG. 4B are organized with more priority levels than in FIG. 4A.

In some implementations, the strategic guidelines within a priority group may not be ordered. In some cases, the strategic guidelines within a priority group may be partially strictly ordered or fully strictly ordered. For instance, the priority group Stress to Humans (409) may include two strategic guidelines "avoid stressing a pedestrian" and "avoid stressing a bicyclist". These two guidelines may be considered with a relative priority that is not strictly pre-defined in the group Stress to Humans (409). In some scenarios, "avoid stressing a pedestrian" may be given a higher priority than "avoid stressing a bicyclist", e.g., in a road environment where there is a pedestrian but no bicyclist. In some examples, "avoid stressing a bicyclist" may be given a higher priority than "avoid stressing a pedestrian", e.g., in a road environment where the autonomous system is closer to a bicyclist than to a pedestrian.

In some implementations, partially strict ordering or fully strict ordering of priority groups or partially strict ordering or fully strict ordering of strategic guidelines within a priority group may be pre-determined before an autonomous system operates in a motion environment. In some implementations, the partial or strict ordering may be determined while the autonomous system is operating in a motion environment. For example, when an AV system drives from Canada to the United States, the traffic laws may change, and thus the ordering may be adapted when the AV system drives cross the country border.

Implementations of classifying priority groups may treat a single strategic guideline as a single priority group. In such implementations, ordering the priority groups amounts to ordering the strategic guidelines. In some cases, each strategic guideline may be assigned a priority level. In some examples, the guideline processor may use the deviation metrics J of the strategic guidelines to determine their relative priority levels.

The hierarchical priorities (or principles of overriding) may be used for planning motions of an autonomous system. For example, when a pedestrian jaywalks in front of an autonomous system, the safety of humans (e.g., the pedestrian in this example) 401 should be given priority over (should override) the safety of property (e.g., the AV system itself) 407. In other words, some strategic guidelines derived from the basic principles of ethics may override some strategic guidelines derived from the basic principles of traffic laws and regulations.

The hierarchical priorities (or principles of overriding) may depend on characteristics of motion environments (209 in FIG. 2). Examples of the environmental characteristics include time, road configurations, city environment, infrastructures, frequency of risky events, and weather. For example, when an autonomous system moves from one jurisdiction (e.g., Massachusetts) to another (e.g., Connecticut), some of the basic principles (e.g., those described in state laws) may change. For example, some towns may have deployed a vehicle-to-infrastructure system, which can ease navigation of autonomous vehicles and where some basic principles (e.g., operating autonomous vehicles on roads) are different from other towns without a vehicle-to-infrastructure system. The change in the motion environments may result in different strategic guidelines, or different priority groups, or different priority levels, or combinations of them.

Figure 5:
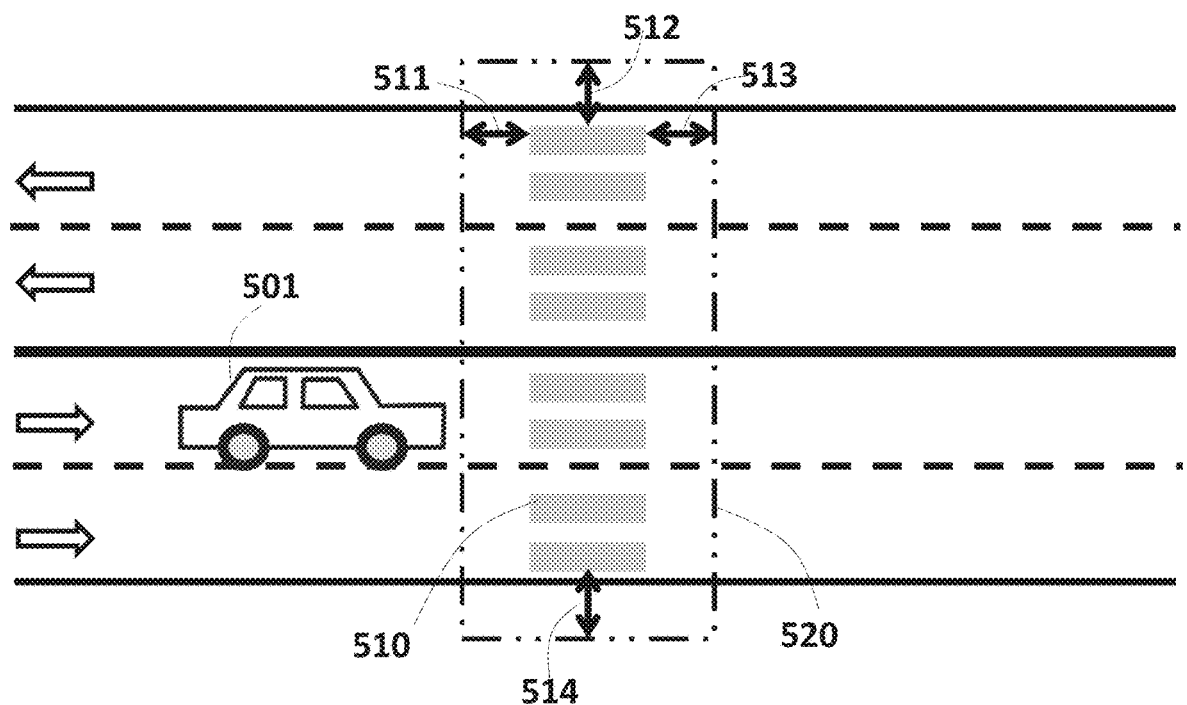
FIG. 5 shows examples of strategic factors.
Figure 5:
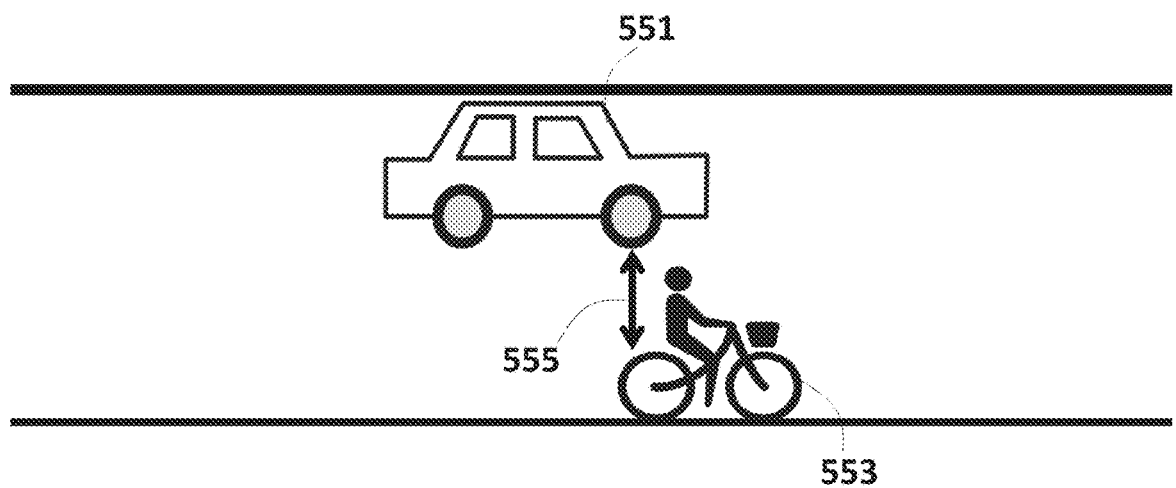

Implementations of the guideline processor 300 may include a strategic factor analysis (320 in FIG. 3), which characterizes strategic guidelines using one or more strategic factors (338 in FIG. 3), such as distances, speeds, accelerations, decelerations, times, temperatures, seasons, chemical concentrations, zones, heights, and weights, to name a few. Strategic factors can relate to basic principles, conditions, proper actions, priority levels, obeyance, violations, and deviations. The strategic factor analysis may be realized by machine learning algorithms. For example, the proper action "yield to a detected pedestrian" specified by a strategic guideline may be associated with one or more or all of the following strategic factors: a speed of the autonomous system, an orientation of the autonomous system, a height of the autonomous system, a deceleration of the autonomous system, a time to a stop, a buffer zone, a distance to another object (e.g., a moving vehicle, a parked vehicle, another pedestrian, a tree, a curb, a building, or an obstacle), or a distance to a pedestrian crossing, or combinations of them. FIG. 5 illustrates examples of distances and a buffer zone. The pedestrian crossing 510 may be assigned a buffer zone 520 characterized by distance strategic factors (e.g., 511, 512, 513, and 514) between the edges of the crossing and the buffer zone boundary. When an autonomous system (e.g., an AV system 501) approaches a pedestrian crossing 510, the autonomous system may consider the strategic factors to evaluate its proper actions.

A special type of strategic factors is time, which may include a time interval or a time point (e.g., a time of a day, a time of a week, or a time of a year, or combinations of them), or both. In the example of time intervals, the strategic factors may include a start time and an end time, or a start time of a duration, or a duration until an end time. In some cases, time intervals are descriptive, such as morning, afternoon, evening, quiet hours, peak hours, holidays, and seasons. In the example of a time point, the strategic factors may include a specific time (e.g., 11:52 am). In some implementations, a proper action (denoted as "ACTION") associated with a time factor may be stated as: "always perform the ACTION during Interval;" "never perform the ACTION during Interval;" "perform the ACTION once during Interval;" or "sometimes perform the ACTION during Interval."

The strategic factor analysis (320 in FIG. 3) may include a machine learning process to infer what kinds of strategic factors should be associated with a strategic guideline, and relevant values of the strategic factors. The guideline processor may initiate a list of strategic factors. The strategic factor analysis 320 may use various sources of data (e.g., basic principles 302, map 304, sensor data 306, and historical motion behaviors) to identify strategic factors dependent on strategic guidelines. Once dependent strategic factors are determined, the data is further used to evaluate the values of strategic factors. Referring to FIG. 5, for example, a strategic guideline in the priority group of Stress to Humans (409 in FIG. 4A) may consider a machine 551 (e.g., an AV system) passing a bicyclist 553. The learning algorithms may create an initial list of strategic factors: time, the speed of the autonomous system, the color of the AV system, and the distance 555 to the bicyclist. Analysis of data may determine that the time, the speed of the AV system, and the color of the AV system are independent of the stress to the bicyclist 553, but the distance 555 to the bicyclist 553 is anti-correlated to the stress. The smaller the distance 555, the higher the stress to the bicyclist 553. The machine learning analysis on the data may further infer a minimum distance (e.g., 0.5 m) that lets the bicyclist feel no stress.

Figure 6:
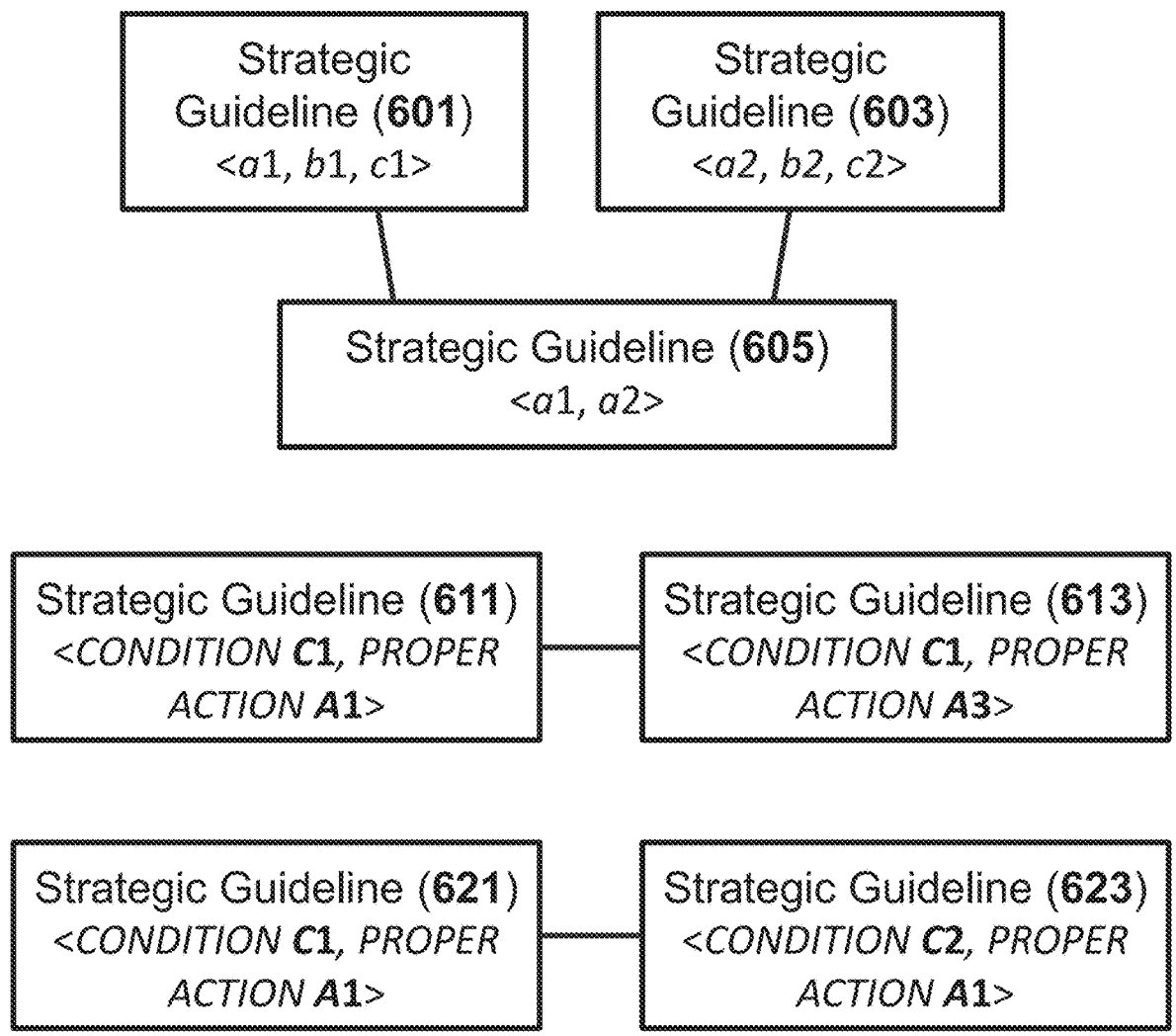
FIG. 6 shows an example of a strategic factor analysis.

In some implementations, the strategic factor analysis (320 in FIG. 3) may establish links between strategic guidelines, where strategic guidelines associated with a common strategic factor may be linked. For example, FIG. 6 shows that strategic guideline 601 with strategic factors <a1, b1, c1> is linked to strategic guideline 605 with strategic factors <a1, a2>, due to the common strategic factor a1. The strategic guideline 603 with strategic factors <a2, b2, c2> is linked to strategic guideline 605, due to the common strategic factor a2. A purpose of linking is to identify possible missing strategic factors in the strategic factor analysis. When two strategic guidelines are linked, the guideline processor may reevaluate if any non-common strategic factors should also be associated with another strategic guideline. For example, the strategic guideline 601 shares the strategic factor a1 with the strategic guideline 605. The guideline processor may further evaluate if the strategic factor a2 should be associated with the strategic guideline 601, or if the strategic factors b1 and c1 should be associated with the strategic guideline 605, or both.

In some implementations, the linking may be based on a common condition across strategic guidelines. FIG. 6 illustrates an example where the linked strategic guidelines 611 and 613 share a common condition C1 but have different proper actions A2 and A3, respectively. In some examples of the AV system, when a condition in a strategic guideline includes a detected stop signal (e.g., red light), two different strategic guidelines may define different proper actions, such as making a full stop and keeping a distance from a leading vehicle. Since these two strategic guidelines share a common condition, they may be linked.

Similarly, the linking may be based on a common proper action across strategic guidelines. FIG. 6 illustrates an example where the linked strategic guidelines 621 and 623 share a common proper action A1 but have different condition C1 and C2, respectively. For example, two strategic guidelines may state "when a bicyclist is seen, keep a safe buffer zone from the bicyclist" and "when a pedestrian is seen, keep a safe buffer zone from the pedestrian." Although the two strategic guidelines are different, they share a common proper action and may be linked in the machine learning process for strategic factor determination.

In some implementations, the strategic factor analysis (320 in FIG. 3) may use real data or simulated data or both types of data (e.g., map 304 and sensor data 306) to determine strategic factors and relevant values of the strategic factors. Some real data is collected by operating autonomous systems in real environments. Some simulations may be computationally derived from hypothetical environments for operating the autonomous systems, e.g., road configurations, air space scenarios, navigation paths, traffic speeds, traffic volumes, traffic lights, traffic signs, objects, and weather conditions. The use of the data may include statistically evaluating the strategic guidelines, such as frequency of invoking strategic guidelines, prioritization relations, and values of strategic factors. The statistical evaluation may be fed back to the guideline processor to adjust the strategic guidelines. The feedback adjustment and the guideline processing, which may be performed iteratively, will cause the strategic guidelines to converge to a steady state.

Implementations of the guideline processor may include a deviation analysis (322 in FIG. 3) determining a deviation metric (340 in FIG. 3) for a strategic guideline. In some cases, the deviation metric may be a function of one or more strategic factors associated with the condition or proper action or both of the strategic guideline. For example in FIG. 5, a basic principle expressed by a strategic guideline may state: avoid stress to a bicyclist 553 when an AV system 551 passes by the bicyclist. The strategic factor analysis 320 based on learning algorithms may infer that: the smaller the distance 555 (denoted mathematically as d), the higher the stress to the bicyclist 553. Thus, the deviation metric may be an inverse function of the distance: $J=1/d$. In other words, when the AV system 551 becomes too close to the bicyclist 553 (i.e., d is a small number), the basic principle associated with the strategic guideline of avoiding the stress to bicyclists may be deviated from or violated. The deviation metric $J=1/d$ quantifies the degree of the deviation or violation. A threshold may be applied to the deviation metric to indicate that the basic principle associated with the strategic guideline is not considered to be deviated from or violated. In this example, if the distance d is determined to be at least 0.5 m for obeying the strategic guideline, the deviation metric may be set to 0 when d>0.5 m (i.e., the threshold for the deviation metric is $J=1/0.5=2$).

The choice of deviation metrics (340 in FIG. 3) depends on strategic guidelines. In some cases, a deviation metric may be a weighted sum of strategic factors. In some implementations, a deviation metric may be equal to or proportional to a strategic factor. In some embodiments, a deviation metric may be inversely proportional to a strategic factor. In some scenarios, the deviation metric may be a function of strategic factors to compute an energy loss, a financial cost, or a time waste, or combinations of them. In some examples, a deviation metric may be a probabilistic function of strategic factors. In some applications, a deviation metric uses a probabilistic modeling on a proper action. In some implementations, a deviation metric does not include a probabilistic modeling on a proper action.

Implementations of the guideline processor (300 in FIG. 3) may include a machine instructions translator (324 in FIG. 3) to express strategic guidelines as parts of one or more computer programs 342 to be executed by a motion planner, e.g., during the period when an autonomous system is being operated. For example, a basic principle may state: yield to pedestrians. Deriving a strategic guideline from the basic principle may include a condition where a pedestrian is detected in front of the autonomous system (e.g., an AV system, a patrol robot, or a lifting robot). Such a condition may be translated into a computer language as:

```
define pedestrian_in_front_of_us(t: Time) as {
    at time t:
        there exists p in actors such that
        p is pedestrian and
        (pose of p) is in_front_of_us(p);
}
```

The strategic factors associated with the condition pedestrian_in_front_of_us(t) may be a distance between the autonomous system and the pedestrian, and the pseudocode in_front_of_us(p) described in a computer language may be:

```
define in_front_of_us(pose x, y in global frame) as {
    define X, Y as pose of the autonomous system;
    define dx as (relative_pose);
    define dy as (relative_pose);
    return dx=abs(X-x) and dy=abs(Y-y);
}
```

A deviation metric deviation_metric(dx, dy) may be defined as an inverse of the distance between the pedestrian and the autonomous system, and the pseudocode deviation_metric(dx, dy).

```
define deviation_metric(dx, dy) as {
    return J = 1/sqrt((dx)×(dx)+(dy)×(dx));
}
```

A proper action associated with the condition pedestrian_in_front_of_us(t) may be yield_to_pedestrian(dx, dy), and the pseudocode described in a computer language may be:

```
define yield_to_pedestrian(dx, dy) as {
    decelerate_to_stop(dx, dy);
}
```

In this example, the descriptive basic principle of "yield to pedestrians" is transformed into a computer-implementable strategic guideline in machine instructions: pedestrian_in_front_of_us(t), in_front_of_us(p), deviation_metric(dx, dy), and yield_to_pedestrian(dx, dy). The control of the autonomous system may execute these machine instructions to comply with the basic principle.

Implementations of the guideline processor (300 in FIG. 3) may generate a database of strategic guidelines 350, which will be used by motion planner to identify optimal trajectory and motion actions of an autonomous system in an environment.

Motion Planner

A basic activity of a motion planner is to identify feasible and safe trajectories towards a goal position.

Figure 7:
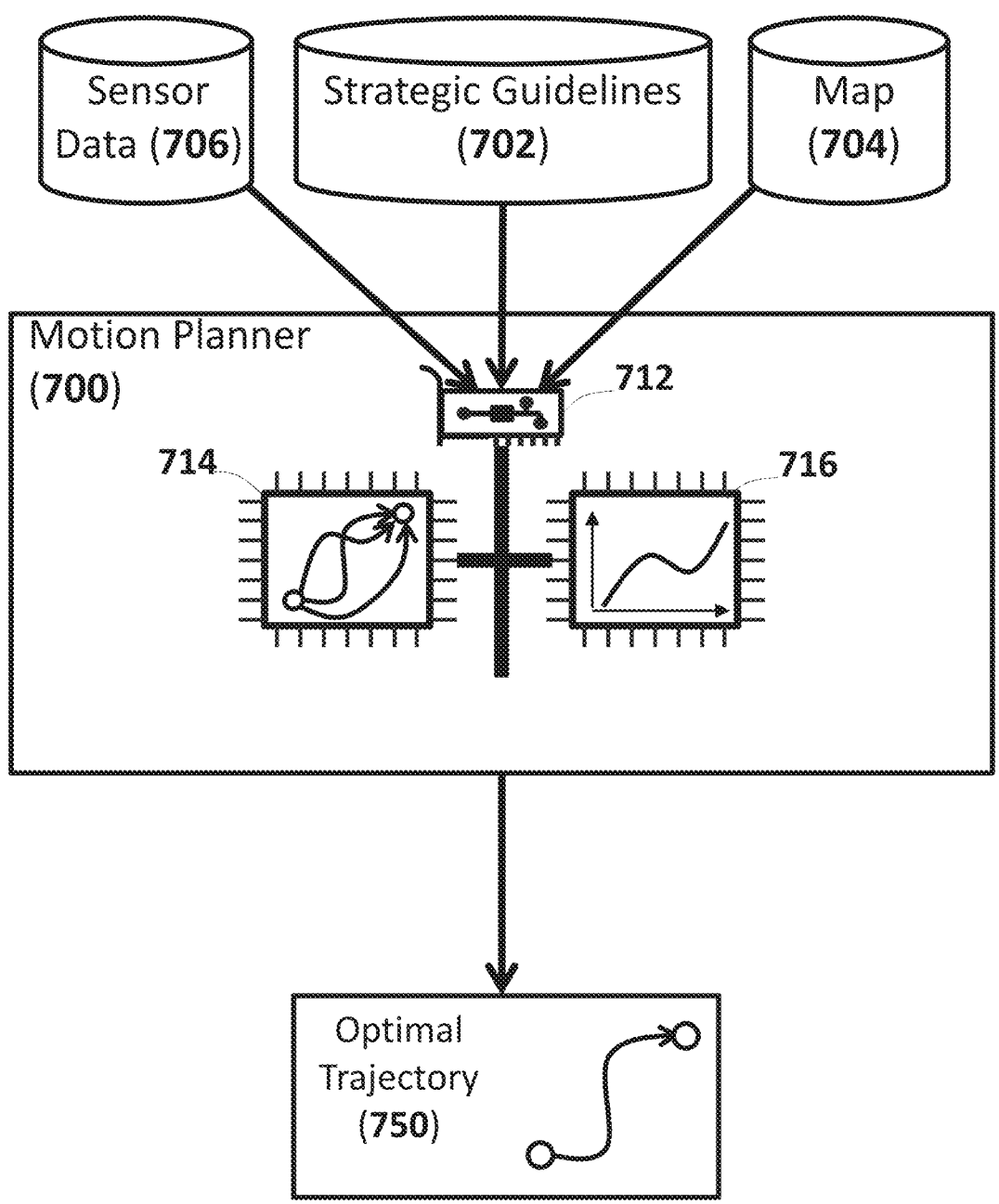
FIG. 7 shows an example of a motion planner.

Referring to FIG. 7, implementations of a motion planner 700 may include a network interface 712 communicating with one or more data sources, such as strategic guidelines 702, maps 704, and sensor data 706. Examples of sensor data include images, videos, radar signals, lidar signals, GPS signals, ultrasound signals, geolocations, odometer readings, speed profiles, and status of the autonomous system.

Figure 8A:
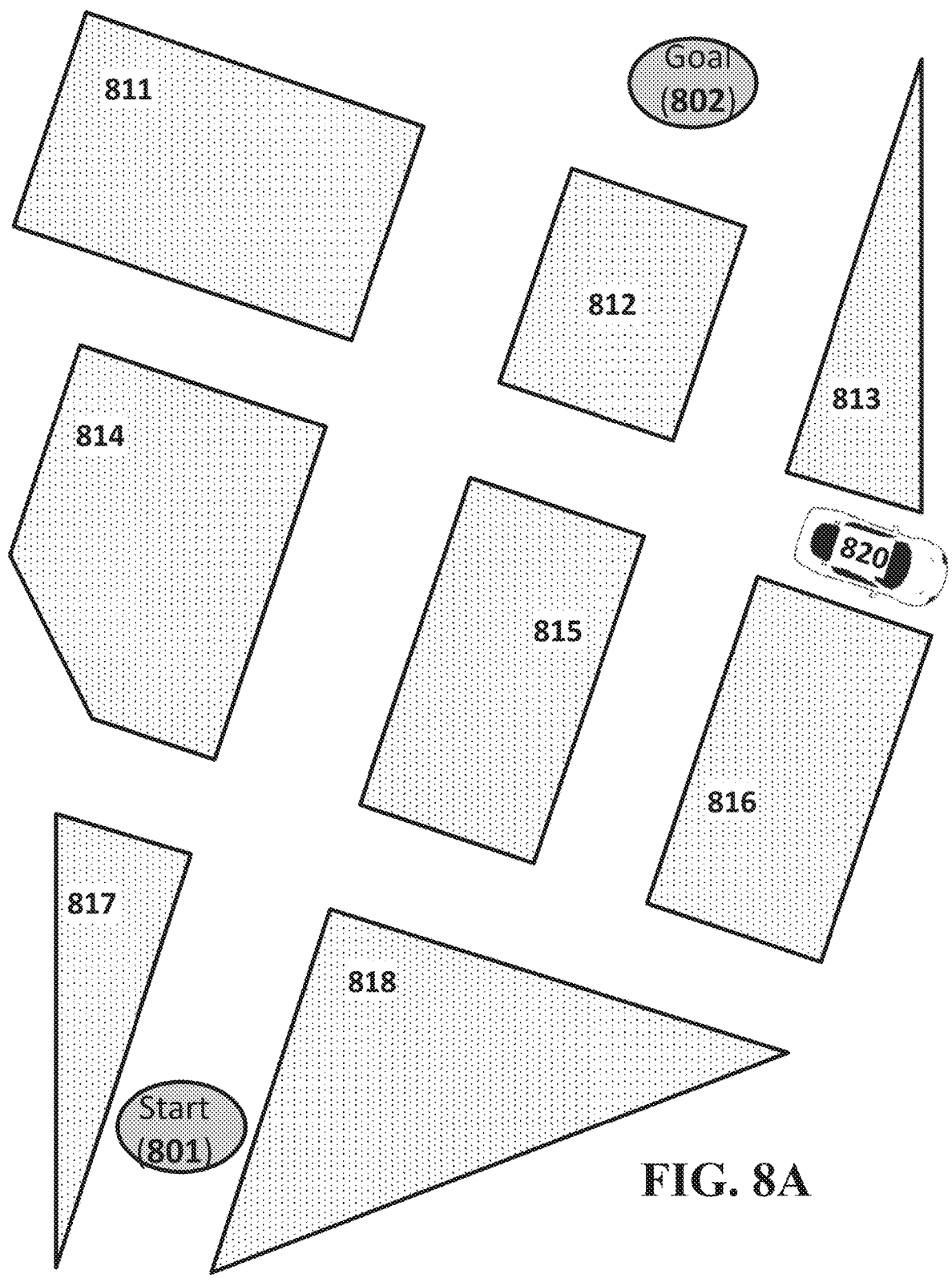
FIGS. 8A, 8B and 8C show examples of trajectory identification.
Figure 8B:
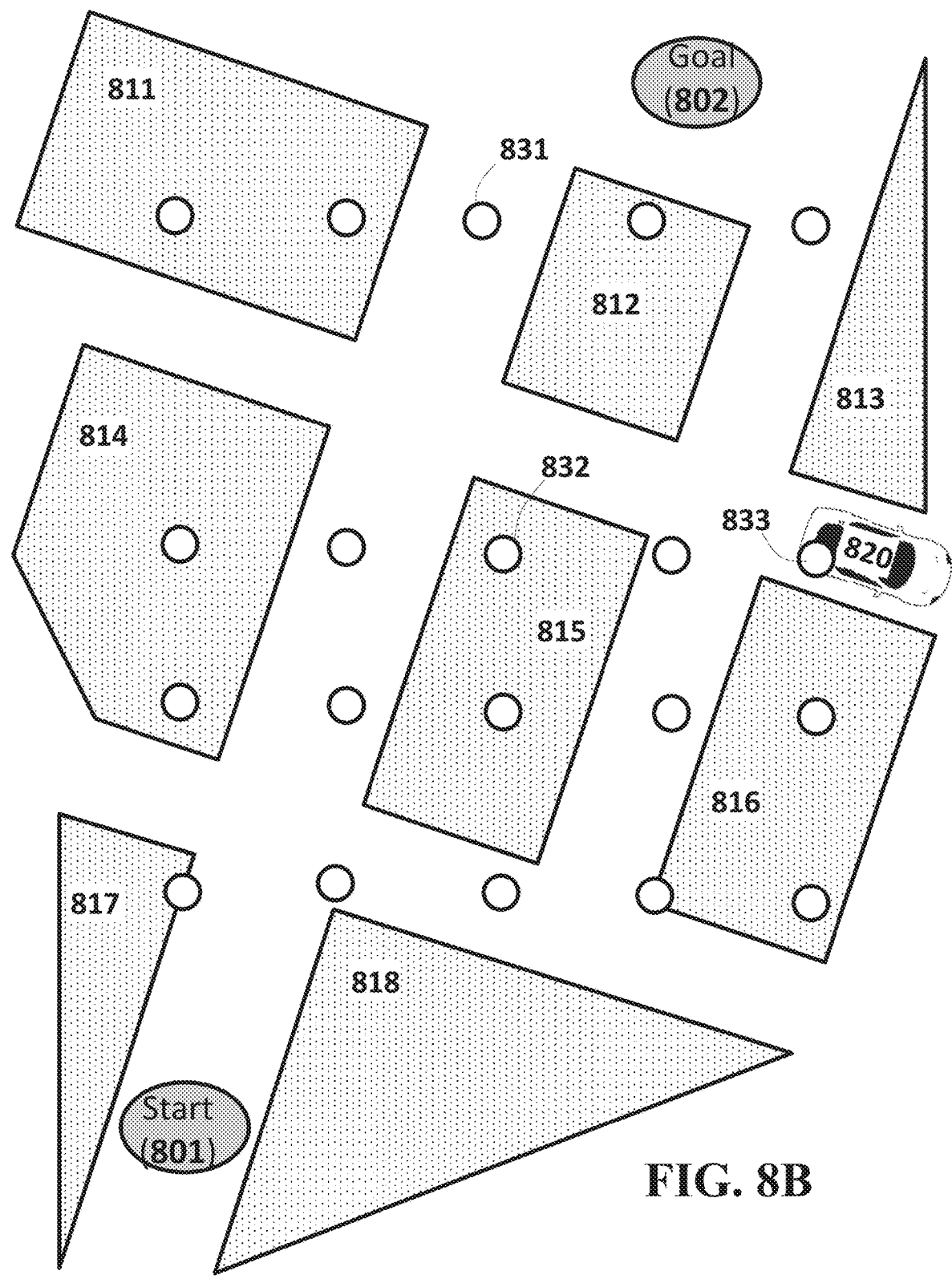
Figure 8C:
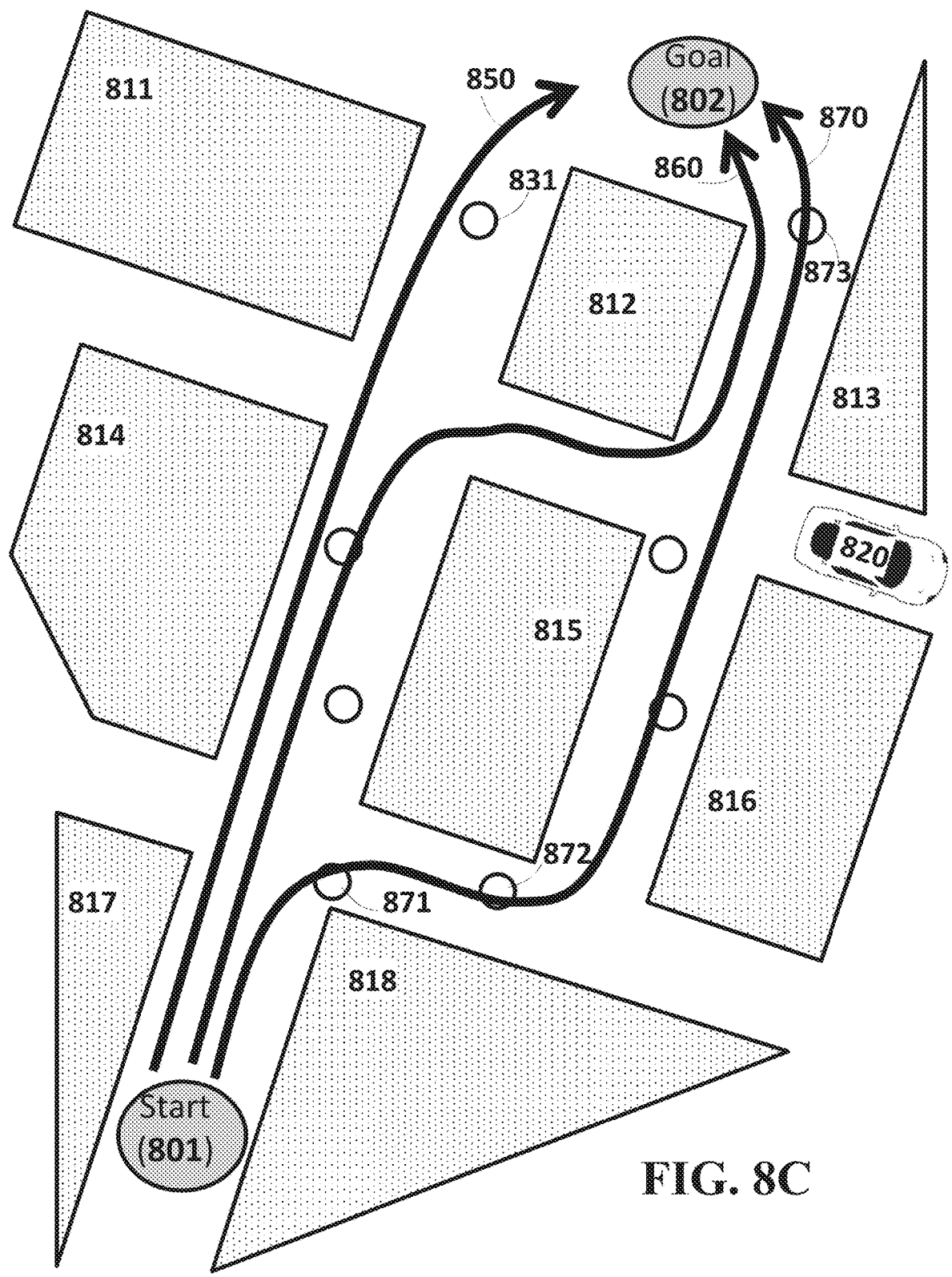

Implementations of the motion planner (700 in FIG. 7) may include a trajectory identifier 714. The trajectory identifier may analyze a map (FIG. 8A) for an autonomous system to navigate from a start position 801 and a goal position 802. The map shows non-drivable regions 811-818, and another vehicle 820 on the road. To identify possible trajectories, the trajectory identifier may begin by sampling the map; for example, FIG. 8B shows the sampling points (represented by small white dots, such as 831, 832 and 833). The samples that are in the non-drivable regions 811-818 or blocked by an object (e.g., the vehicle 820) are then removed; e.g., the sampling points 832 and 833 will be removed and the point 831 will remain. Referring to FIG. 8C, based on the remaining sampling points, the trajectory may identify multiple candidate trajectories (e.g., 850, 860 and 870)

Computationally, let X denote the set of all candidate trajectories x identified by the trajectory identifier 714. The task of the motion planner is to select an optimal trajectory x̂ in the candidate set X for the autonomous system to reach its goal position. (Additional information about trajectory identification is contained in U.S. patent application Ser. Nos. 15/078,143, 15/182,281, 15/182,313, 15/182,360, 15/182,400, and 15/182,365, all of which are incorporated here by reference.)

A trajectory (e.g., 850, 860 or 870 in FIG. 8C) may be associated with multiple motion actions (e.g., acceleration, maintain a speed, deceleration, change orientation, stop, follow traffic signals, and avoid hitting objects) that will be executed by an autonomous system in a motion environment to achieve the trajectory. Some motion actions may be performed in parallel (e.g., changing an orientation and deceleration), and some motion actions may be performed in series (e.g., acceleration and then deceleration). For instance, operating an autonomous system along the trajectory 870 may include the following: acceleration at start 801, slow down and make a right turn at 871, maintain a slow speed, make a left turn at 872 when the traffic signal allows the left turn, acceleration, deceleration at 873, and stop at goal position 802.

Implementations of the motion planner (700 in FIG. 7) may include cost evaluation 716 to compute a cost of a trajectory. Each of the motion actions along a trajectory may be associated with one or more motion factors, such as time, moving speed, moving acceleration, moving deceleration, moving orientation, a buffer zone, traffic signal, and a weather condition. Thus, comparing the motion factors of a motion action with the strategic factors of the proper actions in strategic guidelines deviation metrics of operating the autonomous system along the trajectory can be computed. Aggregating (e.g., summing, applying a maximum operator, multiplying, or ranking) the deviation metrics for successive motion actions or for various motion factors or both may result in the cost of the trajectory. Comparing costs of candidate trajectories x allows the motion planner to identify the optimal candidate trajectory 2.

Various implementations may use various cost functions. A cost function may be a binary indicator indicating if a motion action satisfies a strategic guideline or all the strategic guidelines of a priority group. In some examples, a cost function may be a numerical score characterizing the degree of deviation of a motion action from a strategic guideline or from all the strategic guidelines of a priority group.

Implementations of the cost evaluation may be based on priority information (e.g., principles of overwriting, as illustrated in FIG. 4A). A database of strategic guidelines may include a large number of strategic guidelines, so evaluating if one or more motion actions of a trajectory deviate from any of the strategic guidelines may be time-consuming or computationally infeasible. To reduce the computational burden, the cost evaluation may iterate through priority levels from top down. For a given priority level, the motion planner may define a cost as a binary indicator to indicate if the motion actions of a trajectory comply with the proper actions of all the strategic guidelines in that priority level. The costs (binary indicators) of all candidate trajectories x are then compared, and then the optimal trajectory x̂ can be selected. For example in FIG. 4A, the priority group of Safety to Humans (401) is placed as the top priority level, so the cost evaluation may start from this level. There may be two strategic guidelines in the priority group of Safety to Humans (401): avoid hitting a pedestrian (denoted as R1), and avoiding hitting a vehicle operator (denoted as R2). When a trajectory x can cause an autonomous system to avoid hitting any pedestrians and any vehicle operators, the trajectory x satisfies all the strategic guidelines R1 and R2 in the priority group of Safety to Humans (401). However, when another trajectory y can cause the autonomous system to avoid hitting any pedestrians but cannot avoid hitting a vehicle operator, the trajectory y does not satisfy all the strategic guidelines in the priority group of Safety to Humans (401). Therefore, the trajectory x is a better choice than the trajectory y.

In some implementations, when the binary indicator between two trajectories leads to a tie in a priority level (in other words, the relative deviation costs at that level leave two or more of the trajectories in consideration), the cost evaluation may move to the next lower priority level. For example in FIG. 4A, when two trajectories x and y both satisfy all the strategic guidelines in the priority group of Safety to Humans (401), the cost evaluation may move down to priority level 2 where the priority group of Major Infractions (403) is used to compare the trajectories x and y. The cost evaluation may iterate down the priority levels until a single optimal trajectory is found.

In some implementations, when the binary indicators for two trajectories lead to a tie at a priority level, the cost evaluation may compute numerical costs (denoted as C) of the trajectories, where the numerical cost of a trajectory may be a function of the deviation metrics of the strategic guidelines in this priority level. The cost evaluation may compare the numerical costs C of the candidate trajectories and select the optimal trajectory as the one with the smallest numerical cost. In case the numerical costs of the two trajectories are identical, the cost evaluation may move to a next priority level for further cost evaluation.

Figure 9A:
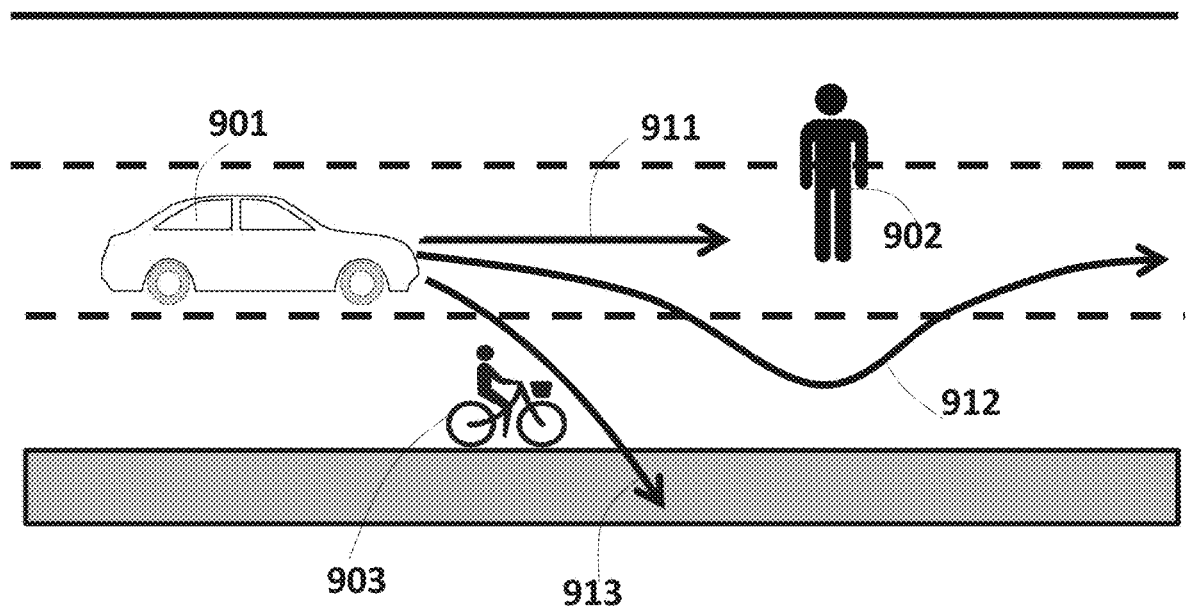
FIGS. 9A and 9B show an example of motion planning.

FIG. 9A illustrates an example where an autonomous system (e.g., an AV system 901) operates on a road. At this moment, a perception process in the AV system may detect a pedestrian 902 in front of the AV system. The detected pedestrian means a change in the moving environment, so the motion planner is triggered in response to the change. Thus, the trajectory identifier finds, for example, three possible trajectories 911, 912 and 913. The motion planner may begin by evaluating the trajectories through the priority levels. Based on the top priority group of Safety to Humans (401) that includes strategic guidelines of avoiding hitting a pedestrian (G1) and avoiding hitting a vehicle operator (G2), the result of the binary cost evaluation for each of the trajectories is summarized as follows.

- The trajectory 911 will cause the AV system to hit the pedestrian 902, so it cannot satisfy the strategic guideline G1.
- The trajectory 912 will cause the AV system to bypass the pedestrian 902 along the same traffic direction, and it satisfies both strategic guidelines G1 and G2.
- The trajectory 913 will cause the AV system to drive away from the pedestrian 902, but bypass a bicyclist 903 and stop at the curbside. In this case, the trajectory 913 satisfies both strategic guidelines G1 and G2.

Thus, the trajectories 912 and 913 are selected as better trajectories than the trajectory 911.

Since the trajectories 912 and 913 are in a tie, the motion planner may further evaluate their numerical costs. Assume that the strategic guidelines G1 and G2 include a strategic factor specifying a buffer zone with a distance d away from the pedestrian or from the vehicle operator, and their deviation metrics J are an inverse of the distance d when d is less than a minimum quantity, say d<0.5 m. Mathematically, J=0 if d>0.5 m, and J=1/d if d<0.5 m. The numerical cost C of a trajectory based on the strategic guidelines G1 and G2 may be C=J(G1)+J(G2). The numerical cost evaluation of the trajectories 912 and 913 is summarized below.

- The trajectory 912 will cause the AV system to have distances from the pedestrian 902 and from the bicyclist 903 greater than 1 meter, so its numerical cost is C=J(G1)+J(G2)=0+0=0.
- The trajectory 913 will cause the AV system to drive away from the pedestrian 902, but bypass the bicyclist 903 with a very small buffer zone, say d=0.1 m. The numerical cost is C=J(G1)+J(G2)=0+1/0.1=10.

Thus, the trajectory 912 is considered better than the trajectory 913.

Figure 9B:
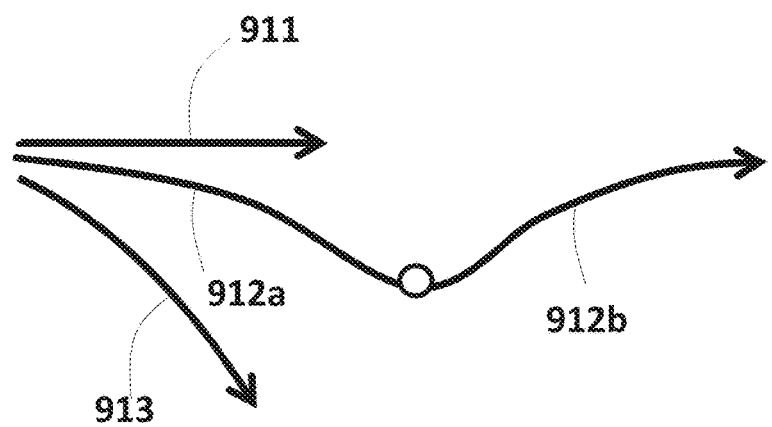

In some implementations, cost evaluation of a trajectory may be performed on parts of the trajectory. For example, the cost of the trajectory 912 in FIG. 9A may not be determinable because the pedestrian 902 may block the view of the AV system 901. Thus, the motion planner may divide the trajectory 912 into components, such as 912*a* and 912*b* in FIG. 9B, where the motion actions along trajectory 912*a* are known to be taken by the AV system 901 but the motion actions along trajectory 912*b* are hypothetical. In some implementations, the cost comparison may aggregate costs of known and hypothetical motion actions along trajectory components 912*a* and 912*b* as the cost of the trajectory 912 for comparing against the costs of trajectories 911 and 913. In some implementations, the cost comparison may be based on comparing the cost of only the trajectory 912*a* against the costs of trajectories 911 and 913.

Deviation Reports

Figure 10:
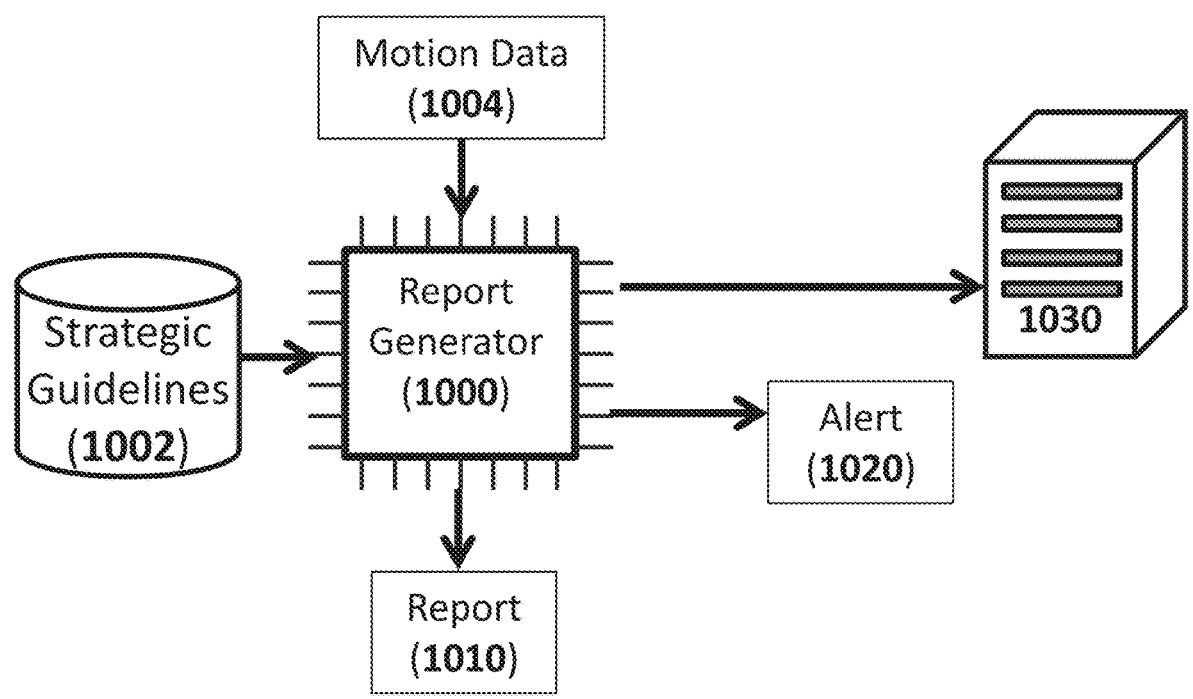
FIG. 10 shows an example of a report generator.

Referring to FIG. 10, a motion planning system may include a report generator 1000 to record motion data 1004 (e.g., trajectories, or decision making on trajectory selections, or motion actions, or motion factors, or combinations of them) of an autonomous system in a report 1010. The report generator 1000 may record the strategic guidelines or components of strategic guidelines 1002 (e.g., conditions, proper actions, strategic factors, or deviation metrics J, or combinations of them) guiding the decision of the trajectories and motion actions of the autonomous system.

In some situations, the autonomous system may execute a motion action not following strategic guidelines 1002, and such scenarios may be inferred by deviation metrics. Typically, the higher value of a deviation metric, the riskier the motion action. In some examples, the report generator may generate an alert 1020 warning of the risky event, which may have taken place or may be predicted to take place. The alert may be visual or aural, or both. The alert may be on board the autonomous system, for example, warning an occupant (e.g., a driver or a passenger), or warning (e.g., siren) another object (e.g., another moving system, a building, a pedestrian, or a bicyclist) in the motion environment, or both. The alert may be transmitted to a remote recipient or computing device 1030, such as a remote operator, an insurance agency, an enforcement officer, or another autonomous system. The transmission may be based on vehicle-to-vehicle communication or vehicle-to-infrastructure communication.

Implementations of the report generator may identify a source of deviation. In some cases, a deviation may indicate that the autonomous system deviates from a strategic guideline. Since a strategic guideline is generated from a basic principle (e.g., a traffic law), the report generator may identify the basic principle from which the autonomous system deviates.

In some implementations, an autonomous system may be involved in a collision. The report may be used to examine if the autonomous system deviated from any strategic guideline or basic principle in the collision. For example, the report may show that the collided autonomous system did not have any deviations in the occurrence of the collision, so the liability for the collision may fall on the other party rather than on the autonomous system. An insurance company or an enforcement officer (e.g., a judge) may use the report to determine the liable party.

Implementations of the report generator may feed the report back to the guideline processor, see 221 in FIG. 2. For example, the report may be treated as past experiences 205, and may include information of sensor data 207 or motion environment 209 or both. Thus, the guideline processor may extract new information from the report to adjust algorithms (e.g., natural language analysis 334, sensor data analysis 316, priority classifier 318, strategic factor analysis 320, deviation analysis 322, or machine instructions translator 324, or combinations of them) in the guideline processor to achieve a better motion planning system.

User Interface

A motion planning system may include a user interface. The interface may be installed in the autonomous system to be used by, for example, an occupant or a remote operator. In some implementations, the interface may be installed on a server. In some implementations, the interface may be implemented as a software application installed on a user's mobile device.

Figure 11:
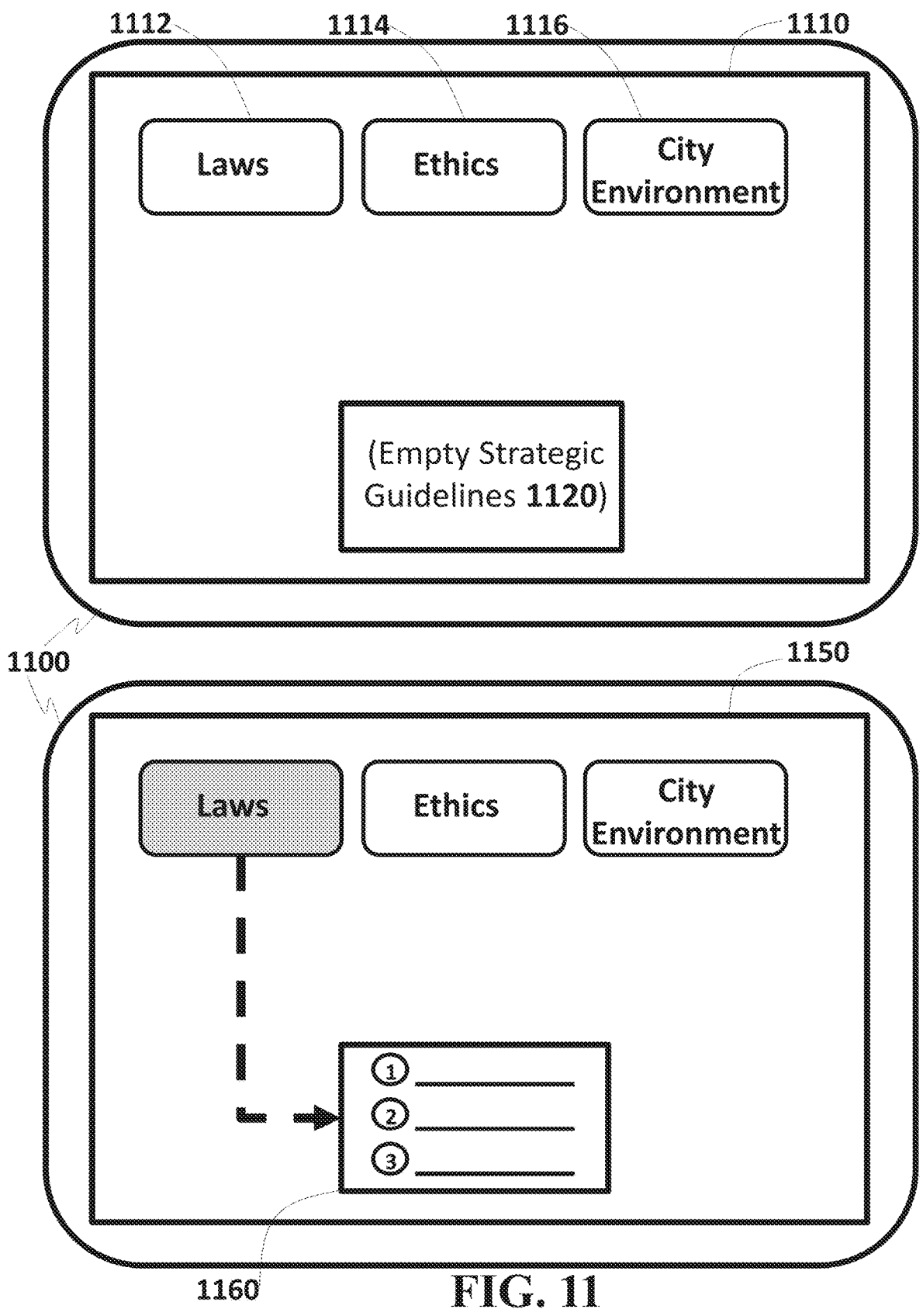
FIG. 11 shows an interface for strategic guideline generation.

Implementations of the interface may allow a user to generate strategic guidelines. Referring to FIG. 11, an apparatus 1100 comprising an interface 1110 lets a user choose sources of basic principles (e.g., laws 1112, ethics 1114, or city environment 1116, or combinations of them) to be used to generate a database of strategic guidelines 1120, which is initially empty. The user may select one or more sources. In this example, the user chooses laws 1112, and the interface 1150 displays that the laws have been imported and analyzed, and that the database of strategic guidelines 1160 now contains strategic guidelines derived from the laws 1112. In some cases, the interface may show the strategic guidelines in a hierarchy of priority levels, such as FIG. 4A.

Figure 12:
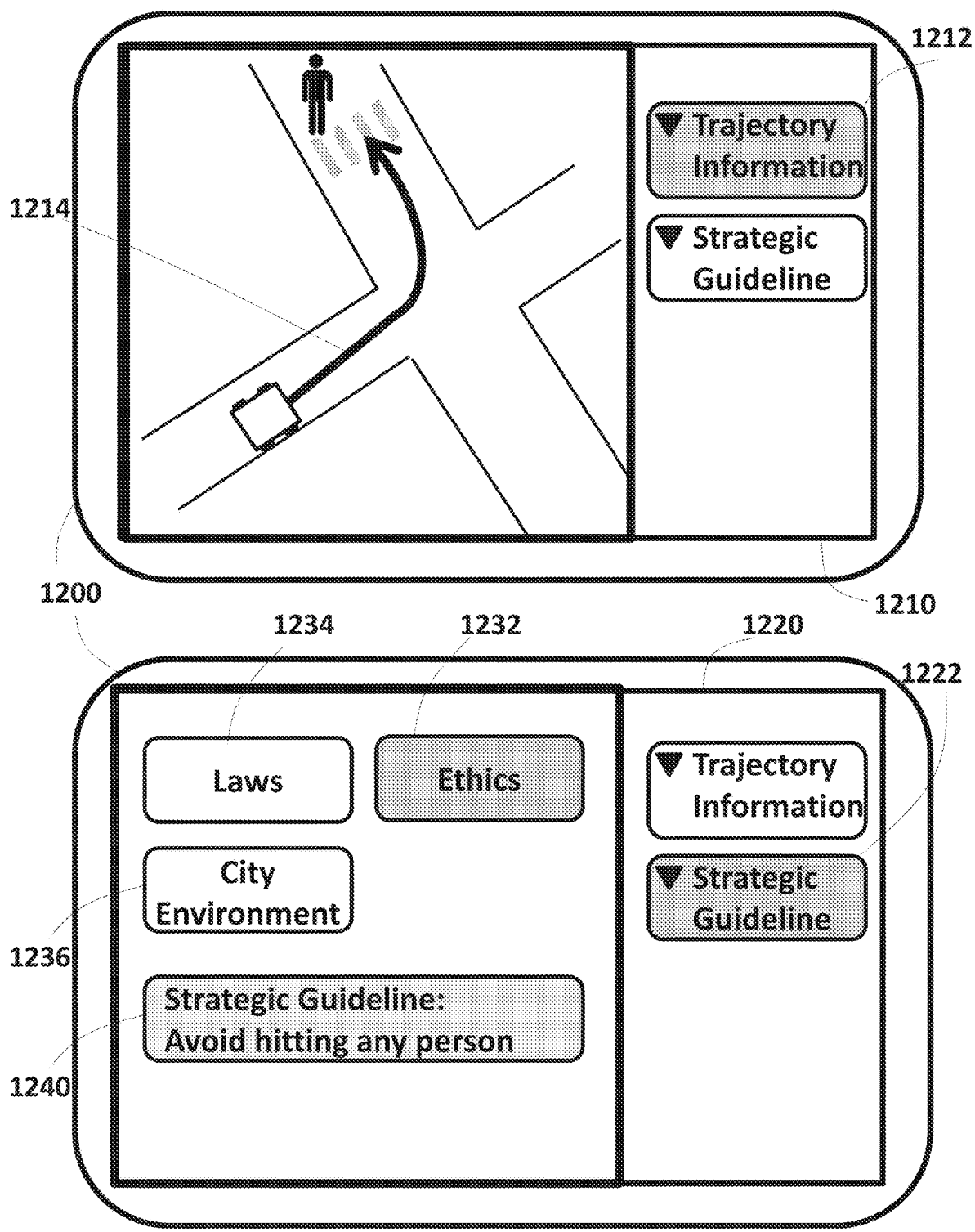
FIG. 12 shows an interface for a rule-based planning system.

Implementations of the interface may allow a user to visualize motion planning for a user. For example, FIG. 12 illustrates an apparatus 1200 with which the user has chosen motion planning information 1212 to be displayed on the interface 1210. In some implementations, the interface 1210 may show a map, a trajectory of the autonomous system, a geolocation of the autonomous system, or an orientation of the autonomous system, or combinations of them. The trajectory may be a current trajectory 1214 of the autonomous system at the current moment, or a snap-shot at a past time, or a combination of them.

In some implementations, the interface may display one or more current strategic guidelines, and allow the user to trace the sources of the strategic guidelines. For instance, the interface 1220 may allow a user to click on the button 1222 to visualize strategic guidelines for the autonomous system. The display may show a current strategic guideline 1240 (e.g., avoid hitting any person) and show the strategic guideline 1240 being sourced from ethics 1232, rather than laws 1234 or city environment 1236.

In some implementations, the interface may allow a user to indicate (e.g., draw, type, gesture, say, or select) his preferences, which may be integrated into strategic guidelines to plan motions of the autonomous system. Examples of preferences include, faster route versus slower route, comfortable motion behavior versus jittering motion behavior, avoiding traffics, avoiding complex road configurations, and avoiding crowds.

In some implementations, the interface may allow a user to force the autonomous system to consider a specific basic principle. For example, there typically are many pedestrians in downtown areas. When driving an AV system in downtown areas, the strategic guidelines derived from ethics may be included in the motion planner by default, or by activation upon instructions from an on-board user or a remote user.

Other implementations are also within the scope of the claims.

The invention claimed is:

1. A method comprising:
obtaining, using at least one processor, sensor data associated with an environment;
obtaining, using the at least one processor, map data associated with the environment;
identifying, using the at least one processor, a set of candidate trajectories for a vehicle to traverse through the environment based on the sensor data and map data, wherein each candidate trajectory comprises successive motion actions of the vehicle;
for each candidate trajectory,
evaluating, using the at least one processor, a cost of the candidate trajectory based on a comparison of the motion actions with strategic factors associated with strategic guidelines, wherein evaluating the cost includes using a cost function that comprises at least one deviation metric characterizing a degree of deviation of a particular motion action from a strategic guideline of a plurality of strategic guidelines, and wherein the plurality of strategic guidelines are logical expressions that are organized into priority groups, and evaluating the costs of the candidate trajectory comprises evaluating the costs of the candidate trajectory by iterating through the priority groups and computing the cost of the candidate trajectory for each priority group;
identifying, using the at least one processor, a particular trajectory from the candidate trajectories based on the evaluated costs of the candidate trajectories; and
operating, using a controller of the vehicle, the vehicle to traverse the particular trajectory in the environment.

2. The method of claim 1, wherein the priority groups are organized in a hierarchy and evaluating the costs of the candidate trajectories further comprises iterating from a top of the hierarchy to a bottom of the hierarchy.

3. The method of claim 2, wherein at least one priority group is organized in a partial order.

4. The method of claim 2, wherein evaluating the costs includes using a cost function that comprises a binary indicator indicating that a particular motion action by the vehicle satisfies a particular strategic guideline or all strategic guidelines in a priority group.

5. The method of claim 1, wherein the logical expressions are derived using natural language analysis that parses and analyzes one or more texts describing at least one of traffic laws in the environment, one or more characteristics of the environment or one or more past motion actions of the vehicle in the environment.

6. The method of claim 1, wherein the logical expressions are derived by tracking two or more objects in the sensor data and inferring a logical relation between the two or more objects.

7. The method of claim 1, wherein the logical expressions are derived by inferring one or more conditions associated with the environment and one or more preferred motion actions of the vehicle in response to the one or more conditions.

8. The method of claim 1, wherein the logical expressions are adjusted based on a statistical evaluation of occurrences of the one or more conditions of the environment, the preferred motion actions of the vehicle in the environment and deviation metrics for evaluating deviations of successive motion actions of the vehicle from the one or more preferred motion actions of the vehicle.

9. The method of claim 1, wherein the one or more strategic factors are associated with physical state of the vehicle or a time interval.

10. The method of claim 1, wherein the one or more strategic factors are inferred using a machine learning process based at least in part on the sensor data and the map data.

11. The method of claim 1, wherein a link is established between two or more strategic guidelines having at least one common strategic factor to identify a possible missing strategic factor in a particular strategic guideline that is included in other strategic guidelines of the two or more strategic guidelines.

12. The method of claim 1, wherein identifying, using the at least one processor, a particular trajectory from the candidate trajectories based on the evaluated costs of the candidate trajectories further comprises:
aggregating, using the at least one processor, deviation metrics included in the strategic guidelines for evaluating deviations of successive motion actions from one or more preferred motion actions of the vehicle; and
identifying, using the at least one processor, the particular trajectory from the candidate trajectories as the candidate trajectory with the smallest deviation from the one or more preferred motion actions based on the aggregated deviation metrics for the candidate trajectories.

13. The method of claim 12, wherein the deviation metrics are evaluated over a component of a candidate trajectory rather than the entire trajectory.

14. The method of claim 12, wherein at least one deviation metric is a weighted sum of strategic factors.

15. The method of claim 12, wherein at least one deviation metric is equal or proportional to at least one strategic factor.

16. The method of claim 12, wherein at least one deviation metric is inversely proportional to strategic factor.

17. The method of claim 12, wherein at least one deviation metric is a function of one or more strategic factors that computes at least one of an energy loss, a financial cost, a time waste or a combination of an energy loss, financial cost and time waste.

18. The method of claim 12, wherein the deviation factor is probabilistic function of one or more strategic factors.

19. A system comprising: one or more sensors;
one or more functional devices configured to receive and act on commands for controlling motion of the system;
a guideline processor configured to:
obtain, using the one or more sensors, sensor data associated with an environment in which the system is operating;
obtain map data associated with the environment;
identify a set of candidate trajectories for a vehicle to traverse through the environment based on the sensor data and map data, wherein each candidate trajectory comprises successive motion actions of the system;
for each candidate trajectory,
evaluating a cost of the candidate trajectory based on a comparison of the motion actions with strategic factors associated with strategic guidelines, wherein evaluating the cost includes using a cost function that comprises at least one deviation metric characterizing a degree of deviation of a particular motion action from a strategic guideline of a plurality of strategic guidelines of, and wherein the plurality of strategic guidelines are logical expressions that are organized into priority groups, and evaluating the costs of the candidate trajectory comprises evaluating the costs of the candidate trajectory by iterating through the priority groups and computing the cost of the candidate trajectory for each priority group; and
identify a particular trajectory from the candidate trajectories based on the evaluated costs of the candidate trajectories; and
traverse the particular trajectory in the environment.

20. The system of claim 19, wherein the priority groups are organized in a hierarchy and evaluating the costs of the candidate trajectories further comprises iterating from a top of the hierarchy to a bottom of the hierarchy.

21. The system of claim 20, wherein at least one priority group is organized in a partial order.

22. The system of claim 20, wherein evaluating the costs includes using a cost function that comprises a binary indicator indicating that a particular motion action by the vehicle satisfies a particular strategic guideline or all strategic guidelines in a priority group.

23. The system of claim 19, wherein the logical expressions are derived using natural language analysis that parses and analyzes one or more texts describing at least one of traffic laws in the environment, one or more characteristics of the environment or one or more past motion actions of the vehicle in the environment.

24. The system of claim 19, wherein the logical expressions are derived by tracking two or more objects in the sensor data and inferring a logical relation between the two or more objects.

25. The system of claim 19, wherein the logical expressions are derived by inferring one or more conditions associated with the environment and one or more preferred motion actions of the vehicle in response to the one or more conditions.

26. The system of claim 19, wherein the logical expressions are adjusted based on a statistical evaluation of occurrences of the one or more conditions of the environment, the preferred motion actions of the vehicle in the environment and deviation metrics for evaluating deviations of successive motion actions of the vehicle from the one or more preferred motion actions of the vehicle.

27. The system of claim 19, wherein the one or more strategic factors are associated with physical state of the vehicle or a time interval.

28. The system of claim 19, wherein the one or more strategic factors are inferred using a machine learning process based at least in part on the sensor data and the map data.

29. The system of claim 19, wherein a link is established between two or more strategic guidelines having at least one common strategic factor to identify a possible missing strategic factor in a particular strategic guideline that is included in other strategic guidelines of the two or more strategic guidelines.

30. The system of claim 19, wherein identifying a particular trajectory from the candidate trajectories based on the evaluated costs of the candidate trajectories further comprises:
aggregating, using the at least one processor, deviation metrics included in the strategic guidelines for evaluating deviations of successive motion actions from one or more preferred motion actions of the vehicle; and
identifying, using the at least one processor, the particular trajectory from the candidate trajectories as the candidate trajectory with the smallest deviation from the one or more preferred motion actions based on the aggregated deviation metrics for the candidate trajectories of the vehicle.

31. The system of claim 30, wherein the deviation metrics are evaluated over a component of a candidate trajectory rather than the entire trajectory.

32. The system of claim 30, wherein at least one deviation metric is a weighted sum of strategic factors.

33. The system of claim 30, wherein at least one deviation metric is equal or proportional to at least one strategic factor.

34. The system of claim 30, wherein at least one deviation metric is inversely proportional to strategic factor.

35. The system of claim 30, wherein at least one deviation metric is a function of one or more strategic factors that computes at least one of an energy loss, a financial cost, a time waste or a combination of an energy loss, financial cost and time waste.

36. The system of claim 30, wherein the deviation factor is probabilistic function of one or more strategic factors.

* * * * *